United States Patent [19]
Adachi et al.

[11] Patent Number: 5,369,265
[45] Date of Patent: Nov. 29, 1994

[54] BAR-CODE READER APPARATUS WITH AN AUTOMATIC READ STARTING FUNCTION

[75] Inventors: Yutaka Adachi, Sagamihara; Mitsunori Kubo, Tokyo, both of Japan

[73] Assignee: Olympus Optical Co., Ltd., Tokyo, Japan

[21] Appl. No.: 66,478

[22] Filed: May 24, 1993

[30] Foreign Application Priority Data

May 26, 1992 [JP] Japan ................... 4-133688

[51] Int. Cl.⁵ ............................... G06K 7/10
[52] U.S. Cl. .................. 235/462; 382/48; 235/470
[58] Field of Search ............ 235/454, 462, 470, 475, 235/476, 477, 479, 375; 358/93, 105; 382/45, 48; 348/155

[56] References Cited

U.S. PATENT DOCUMENTS 5,155,344 10/1992 Fardeau et al. ............ 235/470 X
5,245,167 9/1993 Takenaka ..................... 235/462

FOREIGN PATENT DOCUMENTS 3-208190 9/1991 Japan .

Primary Examiner—John Shepperd
Attorney, Agent, or Firm—Frishauf, Holtz, Goodman & Woodward

[57] ABSTRACT

A stop sensing section senses movements by comparing data on two lines separated by a time interval in the same place (line) of the digital image information on the bar codes from a signal processing section and, when there is no movement, outputs a decode start trigger signal to a decoder section. A CPU in the decoder section, receiving the decode start trigger signal, judges that the bar codes have stopped in the proper position, and reads the bar code image information stored in a frame memory at that time for decoding.

14 Claims, 18 Drawing Sheets

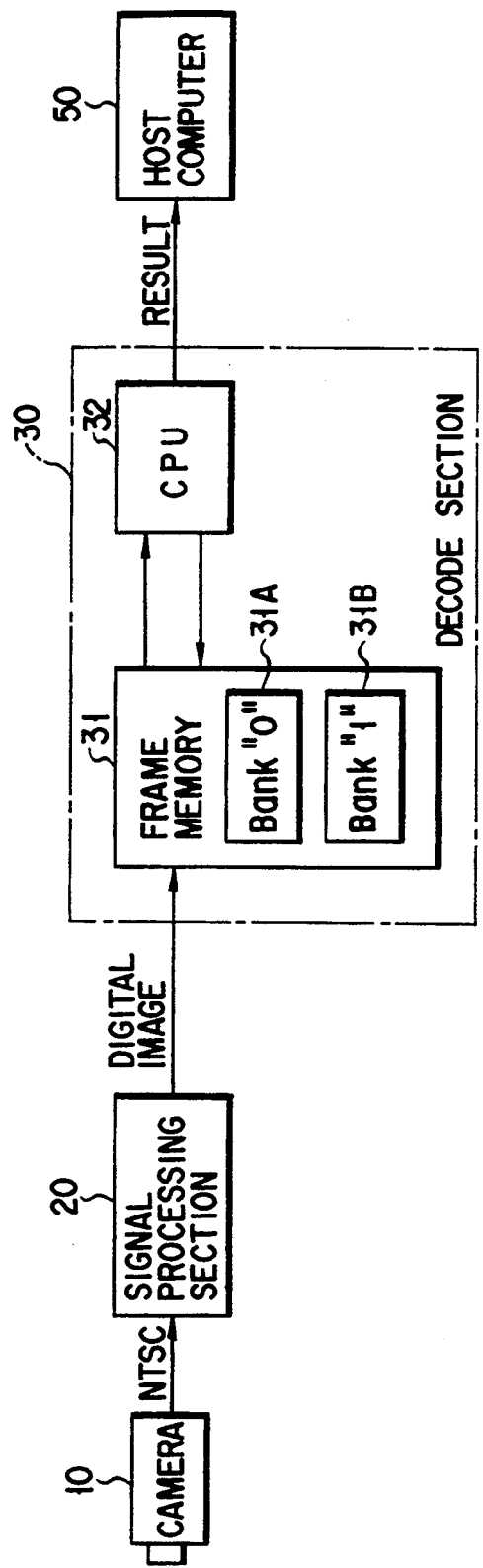
F I G. 5

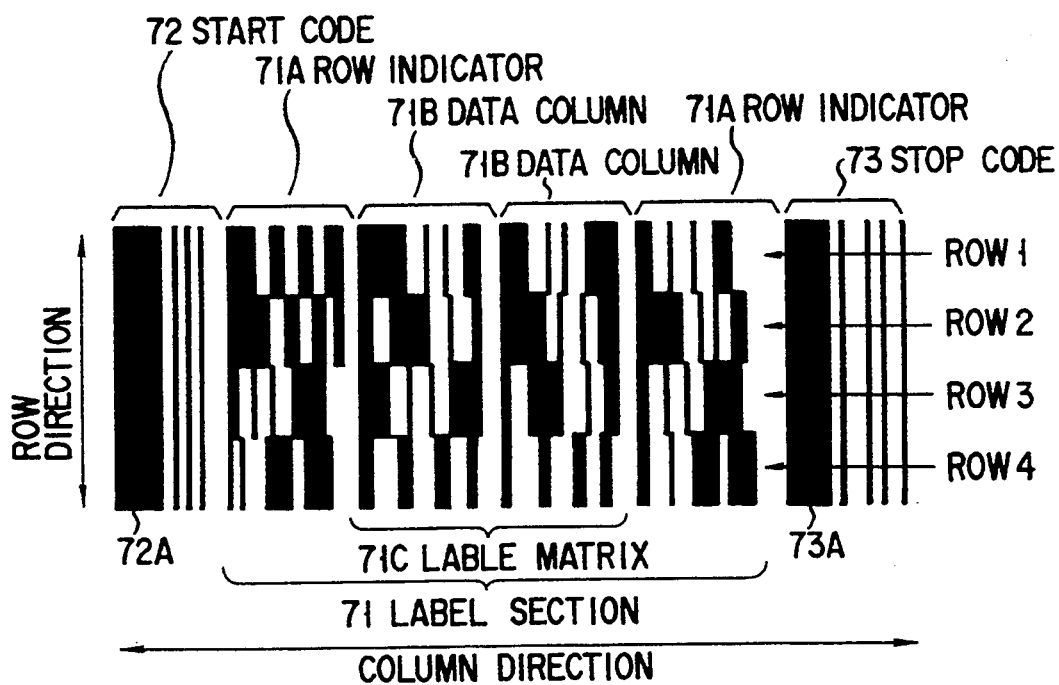
F I G. 6A
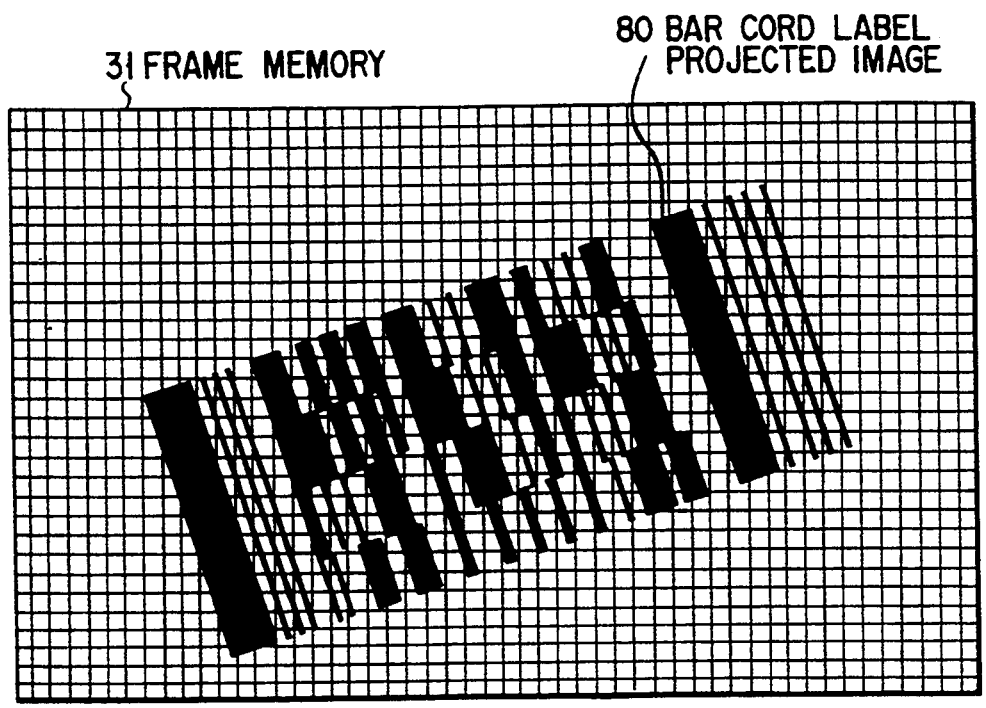
F I G. 6B

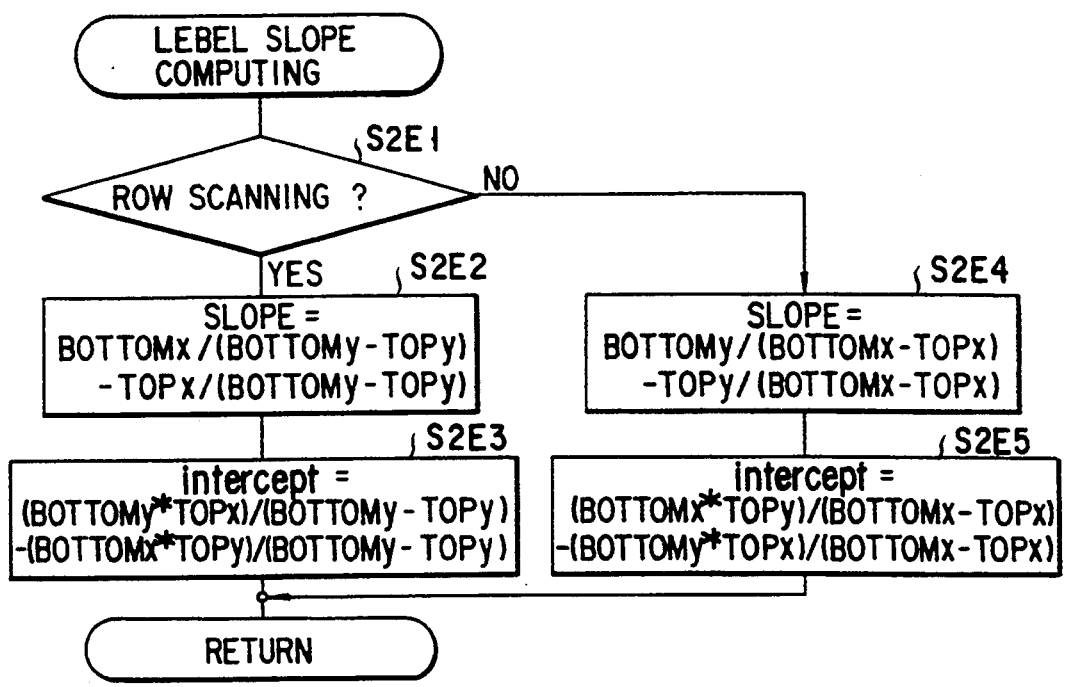
F I G. 15
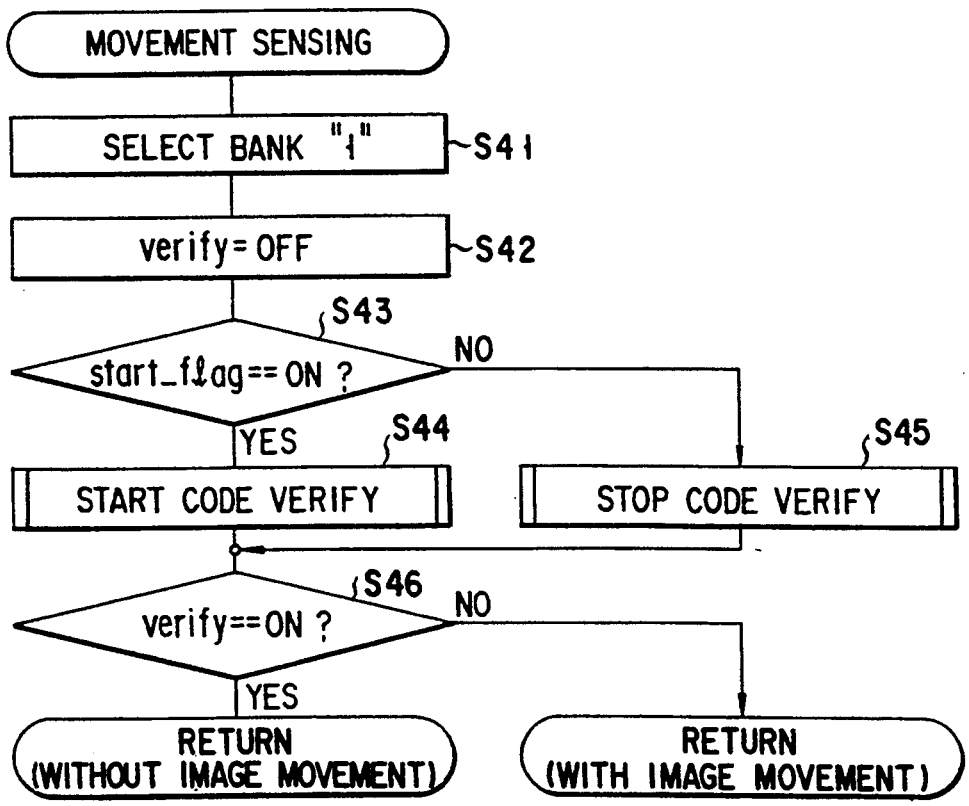
F I G. 16

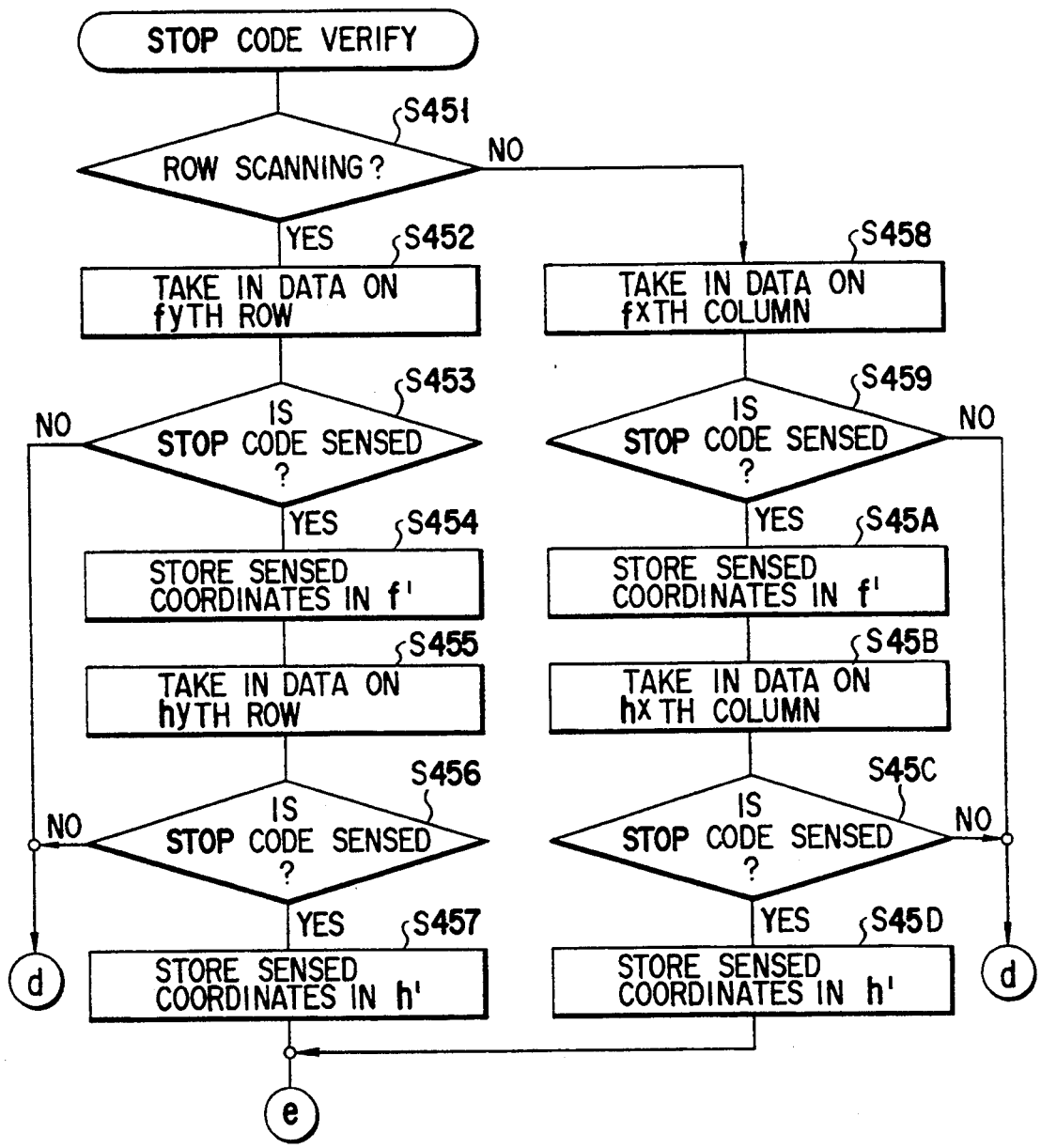
F I G. 18A

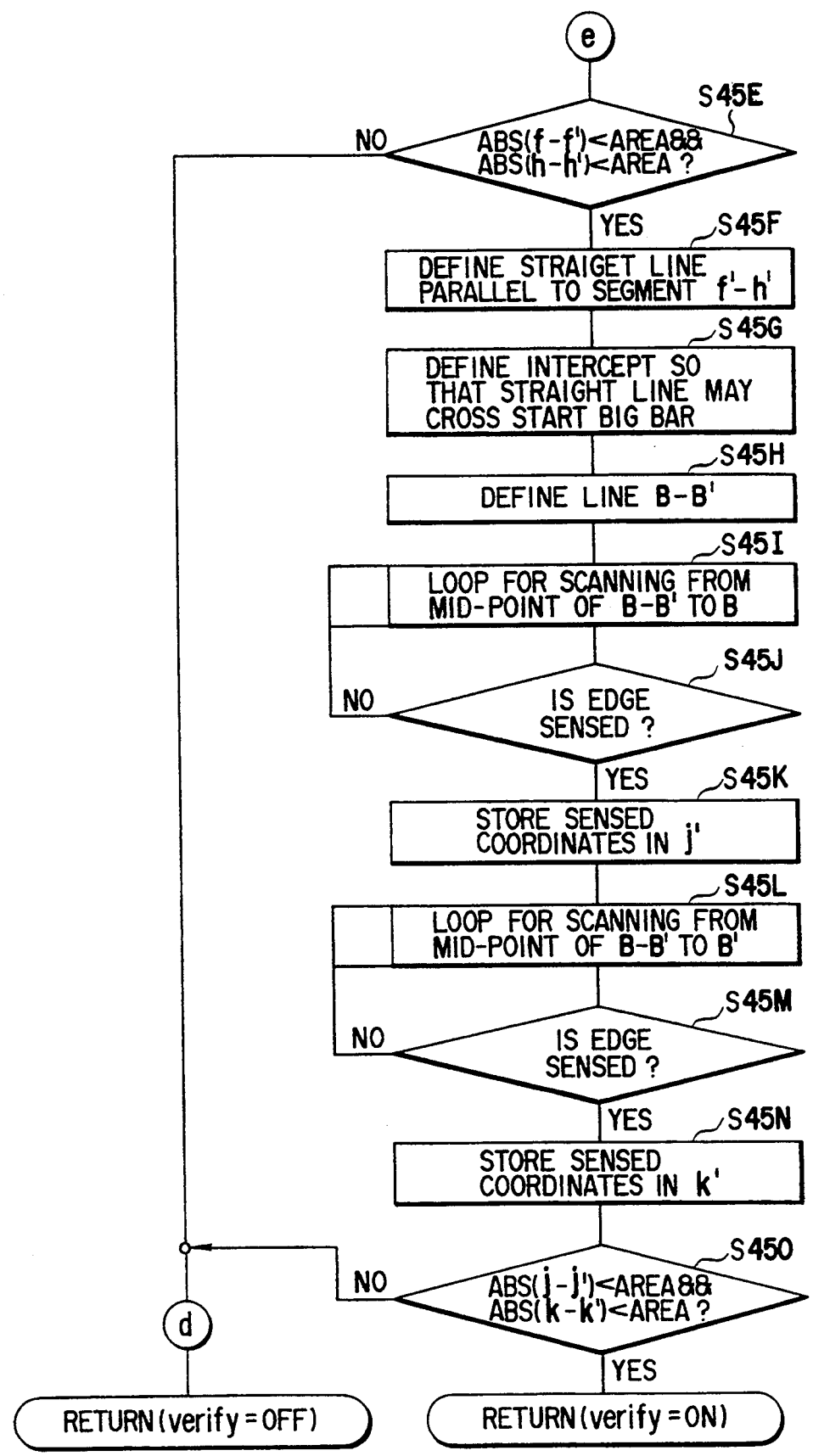
F I G. 18B

BAR-CODE READER APPARATUS WITH AN AUTOMATIC READ STARTING FUNCTION

BACKGROUND OF THE INVENTION

1. Field of the Invention

This invention relates to a bar-code reader apparatus that reads bar codes, and more particularly to the control of the decode start timing of a bar code.

2. Description of the Related Art

With the recent remarkable spread of POS (Point Of Sale) system, bar codes are finding their way into more various applications. A bar code is a symbol constructed in such a manner that bars and spaces of different sizes are combined in parallel to form a single bar code character, and if necessary, a character group including check digits are added in parallel, and then, for example, particular predetermined patterns, such as start and stop characters, are attached before and after the bar code character.

For bar codes widely used for general consumer goods, JAN (Japan Article Number) are standardized in Japan. Another application of bar codes is a distribution material symbol. This symbol is added to the JAN code in the form of a distribution identification code of one or two digits.

Any of the above bar code symbols is called a one-dimensional bar code. The amount of information that those code systems can handle is several tens of bytes at most.

Recently, however, there have been strong demands for a bar code to have a larger amount of information. As if to respond to such demands, various symbol systems called two-dimensional bar codes have been announced.

Any of those symbol systems has the advantage of being able to code a remarkably large amount of information as compared with one-dimensional bar code systems. In one of two-dimensional systems, the amount of information is increased by stacking one-dimensional bar codes. The symbols in such a system are called stacked bar codes. This type of stacked bar codes includes a code system called PDF-417 and a code system called CODE 49.

One of such bar-code readers for reading two-dimensional bar codes is constructed of an image formation optical system composed of lighting, a lens, and a two-dimensional image sensor such as a CCD. When a bar code is read with such a bar-code reader, a two-dimensional bar code is placed in the imaging area of the two-dimensional sensor. As a result, the bar-code image is focused on the two-dimensional image sensor, and the image information is supplied to a decoder as an image signal. The decoder converts the black and white image information of the bars and spaces into numerical information, which is then supplied as the decode result to the outside circuitry.

One method of starting such a decoding action is to always repeat decoding regardless of whether a bar code is present or not. Another method is to start decoding only after the sensor or the operator has judged that the bar code is in the proper position and is ready to be imaged.

As noted above, when a two-dimensional bar code is read, the bar code is moved from the outside into the inside of the imaging area.

with a conventional method that always repeats decoding, the reading of a two-dimensional bar code is begun while the bar code is still moving to the proper position almost in the center of the imaging area. In such a state where the entire bar code cannot be imaged, a bar code without an error correction function cannot be read at all, although bar codes with an error correction function, such as PDF 417 and DATD CODE, can be read. Even bar codes with an error correction function require time for error correction, so that the decoding time is longer than when the entire bar code is imaged.

Further, with a method in which the sensor or the operator judges whether a bar code has stopped in the proper position, a sensor device is necessary or the operator is forced to do extra activities, which is undesirable and liable to cause errors.

SUMMARY OF THE INVENTION

Accordingly, the object of the present invention is to provide a bar-code reader apparatus that can start decoding when the image area of a bar code symbol (hereinafter, referred to as a label) has stopped in the proper position without beginning a decoding process during the label moving, by sensing the practical stop of the label.

According to the present invention, there is provided a bar-code reader apparatus comprising: imaging means for imaging a bar code composed of bars and spaces; sensing means for sensing the movement of an image taken by the imaging means; and control means for controlling the start of a decoding process of a bar code image taken by the imaging means based on sensed signal from the sensing means.

Specifically, with a bar-code reader apparatus of the present invention, the movement of the bar-code image taken by the imaging means is sensed by the sensing means and the control means starts to control the decoding of the bar-code image taken by the imaging means based on the sensed signal from the sensing means. That is, when the sensing means has sensed that there is practically no movement of the image, the decoding process will be started.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram of a bar-code reader apparatus according to a third embodiment of the present invention;

FIG. 6A shows a bar code label in the PDF-417 code system as an example of a stacked bar code;

FIG. 6B is a pictorial view of a bar code label in the PDF-417 code system hypothetically projected onto the pixel array of a frame memory;

FIG. 15 is a flowchart for explaining the label slope computing routine of FIG. 9;

FIG. 16 is a flowchart for explaining the movement sensing routine of FIG. 7;

FIGS. 18A and 18B are a series of flowcharts for explaining the stop code verifying routine of FIG. 18.

DETAILED DESCRIPTION OF THE PREFERRED EMBODIMENTS

Before beginning to explain embodiments of the present invention, a general concept of the invention will be explained for a clearer understanding.

Figure 2A:
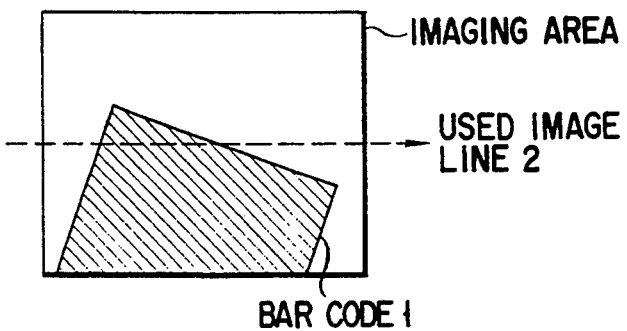
FIGS. 2A through 2C show image lines used in sensing the stop of a bar code.

In the course of a two-dimensional bar code moving to a specified position within the imaging area, the reading of the bar code is not started. Only after the stop of the bar code has been sensed, reading (decoding) is begun. This method of sensing the stop of a bar code uses an image signal of at least one particular line of a bar code image 1 as shown in FIG. 2A, for example. A judgment is made using two lines of data on the same place (line) separated by a time interval. Theoretically, if two sets of data on the same image line 2 separated by a time interval are the same, it can be judged that the image data on the line is not moving and consequently the entire image including the data is not moving either. It is desirable that the line 2 should be set in the scanning direction of a generally used image signal, such as the NTSC image signal. In the NTSC system, since a single screen is transmitted in approximately 1/30 second, for example, the output of a particular scanning line on every 10 screens is the data on the line in the same place at intervals of approximately ⅓ second.

Figure 2B:
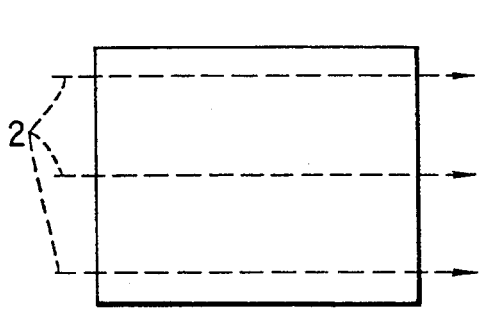
Figure 2C:
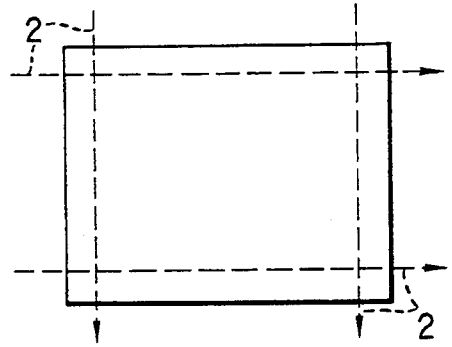

The number of lines, of course, is not restricted to one. Use of more than one line enables more accurate sensing. In this case, the setting positions that are considered suitable for line 2 are the top end portion, the middle portion, and the bottom end portion as shown in FIG. 2B. Use of four lines running close to the four sides of the screen as shown in FIG. 2C makes it possible to sense the stop much more accurately, although the configuration of the system becomes somewhat complicated.

Hereinafter, referring to the accompanying drawings, embodiments of the present invention will be explained.

(First embodiment)

Figure 1A:
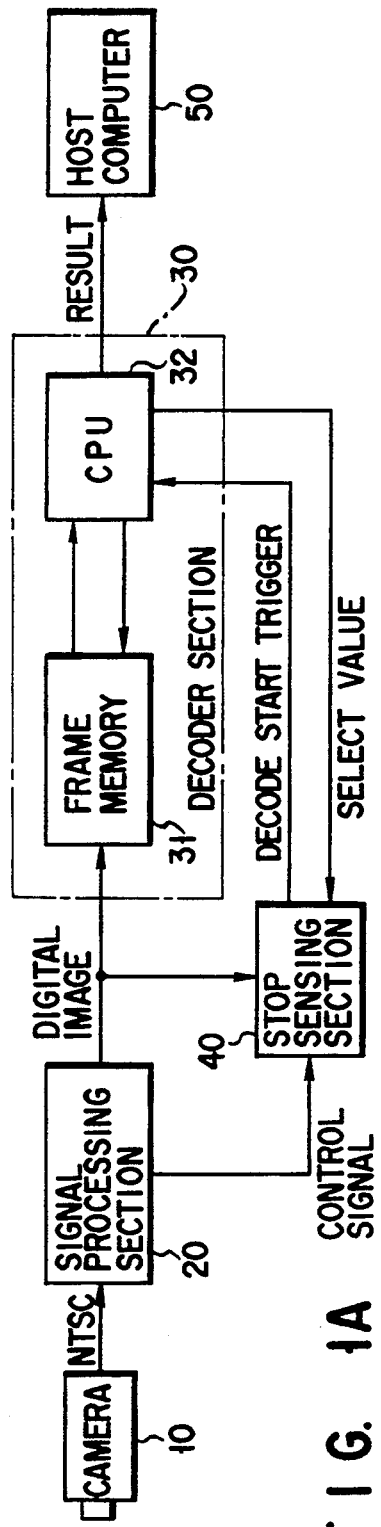
FIG. 1A is a block diagram of a bar-code reader apparatus according to a first embodiment of the present invention.

FIG. 1A is a block diagram showing the construction of a bar-code reader apparatus according to a first embodiment of the present invention. In the figure, the image of a bar code 1 taken by a camera 10 is sent to a signal processing section 20 in the form of generally used image signals such as NTSC image signals. The signal processing section 20 performs the gain adjustment, A/D conversion, and other processing of the input image signal, and outputs digital image information. The digital image information is divided in two, one of which is sent to a decoder section 30 and the other of which is sent to a stop sensing section 40.

The decoder section 30 is composed of a frame memory 31, a CPU 32, and a memory (not shown) used as a work area. The digital signal from the signal processing section 20 is taken in by the frame memory 31 under the control of the CPU 32.

The signal processing section 20 supplies a control signal as well as the digital image information to the stop sensing section 40. The control signal is used to determine the position of a line of the image information (signal) used to sense the stop of a label. As the control signal, this embodiment uses a horizontal synchronizing signal and a vertical synchronizing signal. The CPU 32 supplies to the stop sensing section 40 a select value input signal for determining which line on the screen is selected at what time intervals. The stop sensing section 40 senses the stop of the label, and supplies a decode start trigger signal to the decoder section 30.

The CPU 32 in the decoder section 30 receives the decode start trigger signal and carries out the decoding of the digital image signal stored in the frame memory 31. The decode process converts the light-and-shade image information indicating bars and spaces obtained by reading the digital image information from the frame memory 31, into numerical information, which is supplied as the decode result to the outside circuitry. Normally, the decode result is sent to a host computer 50 or the like, which shows it to the operator.

Figure 1B:
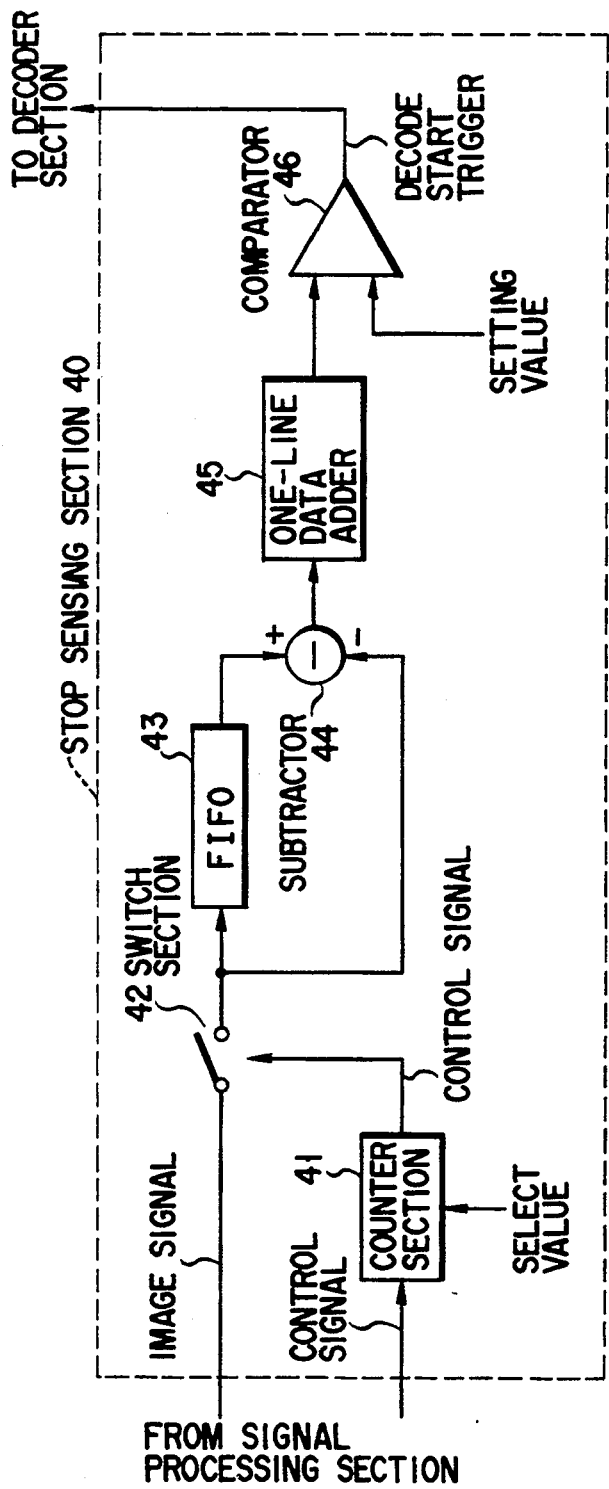
FIG. 1B is a detailed diagram showing the construction of the stop sensing section of FIG. 1.

The stop sensing section 40 is constructed as shown in FIG. 1B. Hereinafter, explanation will be given using a case where the sensing of the stop is done using one of lines 2 shown in FIG. 2B.

Specifically, as a control signal from the signal processing section 20, a horizontal synchronizing signal and a vertical synchronizing signal are supplied to a counter section 41. The counter section 41 is also supplied with a select value input signal from the CPU 32, the input signal determining which line on the screen is selected at what time intervals.

Figure 3:
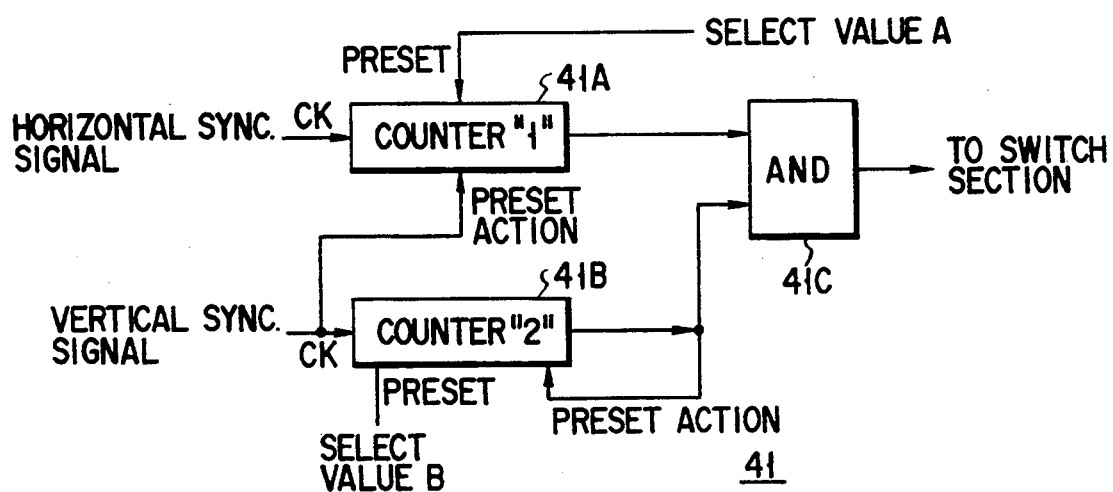
FIG. 3 is a detailed diagram showing the construction of the counter section of FIG. 1B.

The counter section 41 is made up of two counters 41A and 41B and an AND circuit 41C as shown in FIG. 3. The first counter 41A sets a select value A from the CPU 32 for selecting a line, as the initial value in response to the vertical synchronizing signal. After this, it counts the horizontal synchronizing signal from the signal processing section 20. When counting to the select value A, it then supplies a high-level output to the AND circuit 41C. The second counter 41B sets a select value B from the CPU 32 for selecting time intervals at which selection is made, as its initial value, in response to its own high-level output. After this, it counts the vertical synchronizing signal from the signal processing section 20. When counting to the select value B, it then supplies a high-level output to the AND circuit 41C. The AND circuit 41C outputs a control signal (of a high level) when the outputs of both counters 41A and 41B go high. That is, the counter section 41 counts the horizontal synchronizing signal and, when the select line portion determined by the select values A and B has been reached, outputs a control signal. The vertical synchronizing signal is used to set select value A to the counter of the horizontal signal and to measure the time interval by measuring the number of fields. It is assumed that the measurement of the time interval is made using the field discrimination signal from the signal processing section 20. The measurement may be made by measuring the number of fields.

The control signal thus supplied from the counter 41 is sent to a switch section 42 for passing and cutting off the digital image signal. The switch section 42 closes only when receiving the control signal from the counter section 41 and allows the digital image signal to flow. That is, only the signal on the selected line is allowed to flow. The switch section 42 may be made up of a mechanical switch or a three-state element.

The signal on the selected line among the outputs from the signal processing section 20 is divided in two after passing through the switch section 42. One is temporarily stored in an FIFO (First In First Out) memory 43 and then supplied to a subtracter 44, whereas the other is supplied directly to the subtracter 44. The FIFO memory 43, which has such a capacity as is able to store an image signal of one line, is designed so that the first coming data is pushed out by the last coming data.

As mentioned above, the switch section 42 is designed to close when the image signal on the same line in the same field has arrived, so that the subtracter 44 sequentially subtracts light-and-shade data on each pixel in the same place (on the same line) separated by a set time interval. Here, if the picture taken is not in motion, the light-and-shade data on each pixel on the same line separated by the set time interval is the same, with the result that the output of the subtracter 44 is almost zero.

The output of the subtracter 44 is sent to a one-line data adder 45, which adds up the difference between the light-and-shade data on each pixel of one line. The result is sent to a comparator 46, which compares it with a setting value. By the comparison, it is judged whether the output of the subtracter 44 is smaller than the setting value. That is, the setting value indicates the upper limit of the range in which the amount of movement has no effect on the decoding capability.

If the comparator 46 determines that the output of the subtracter 44 is smaller than the setting value, it can be considered that there is practically no movement, so that the comparator 46 sends a decode start trigger signal to the CPU 32 in the decoder section 30. The CPU 32, responding to the decode start trigger signal, starts decoding.

Because the stop sensing section 40 senses the stop of the label by comparing the data on the same line separated by the set time interval, and the CPU 32 starts decoding only when the stop of the label has sensed, the decoding can be started when the label has stopped in the proper position without starting the decoding while the label is still moving.

With the arrangement of the first embodiment, the invention can be applied to the sensing of unintentional movement of a hand in using a hand-held scanner.

(Second embodiment)

Figure 4:
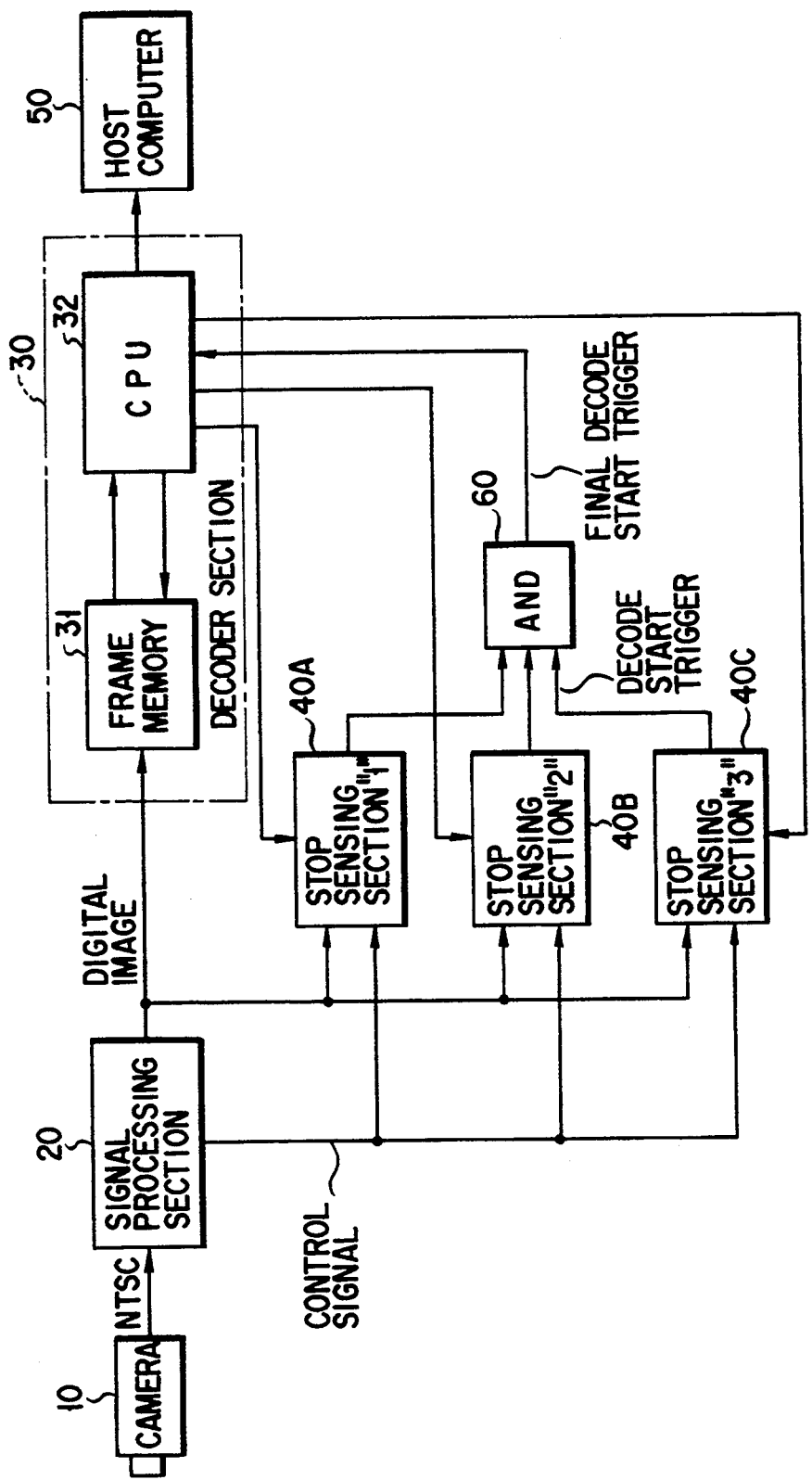
FIG. 4 is a block diagram of a bar-code reader apparatus according to a second embodiment of the present invention.

In the first embodiment, an image signal (information) of a particular line of a bar code image is used. When plurality of lines are used, for example, when three lines are used as shown in FIG. 2B, the number of stop sensing sections 40 has to be increased accordingly as shown in FIG. 4. In this case, the arrangement must be modified so that the AND circuit 60 outputs the final decode start trigger signal to the CPU 32 in the decoder section 30 only when all of the first through third stop sensing sections 40A, 40B, and 40C output a decode start trigger signal.

When plurality of lines 2 are used for sensing as shown in FIG. 2C, it is necessary to provide stop sensing sections 40 whose circuit arrangements are such as to be able to store information on vertical lines of the image as well.

Which lines on the screen are used at what time intervals may be determined by software for the optimum lines.

(Third embodiment)

The function of the stop sensing section 40 may be realized by software as mentioned above. Such a software method will be explained as a third embodiment of the present invention.

First, the concept will be described. While in the first embodiment, the stop of the image is judged using the image information on two lines in a particular place (line) of a bar code image 1 separated by a time interval, in this embodiment, two points at an edge of the bar code image 1 are sensed and, when the position of the two points is the same after a time interval, it is judged that the bar code image is not moving, and then decoding is started.

FIG. 5 is a schematic diagram of the third embodiment. This embodiment has no stop sensing section and uses a frame memory 31 with two screens of capacity (Bank 0 and Bank 1).

FIG. 6A shows the label structure of the PDF-417 code system as an example of a two-dimensional stacked bar code. The bar code label has a label section 71 that is an area of the information components to be decoded, composed of bar code character groups consisting of bars and spaces, as well as a start code 72 and a stop code 73, serving as a start and a stop character, placed before and after the label section. A single code is made up of four bars and four spaces except for the stop code 73. The start and stop codes 72 and 73 begin with thick bars 72A and 73A called big bars, respectively.

The label section 71 is composed of codes called row indicators 71A adjacent to the start code 72 and the stop code 73, and a label matrix therebetween consisting of multiple data columns 71B in which the actual data is written. In the row indicators 71A, the label size in the row and column directions, security levels and others are written. Consequently, by decoding the information in the row indicators, the information size of a label and others can be determined.

FIG. 6A shows a bar code label having a 4×2 label matrix.

FIG. 6B is a pictorial view of a label image in the PDF-417 code system having a 4×1 label matrix hypothetically projected onto the pixel array of the frame memory 31.

The CPU 32, based on the algorithm explained below, senses a label, reads and decodes the label information, and supplies the result to the host computer 50 and the other related circuits.

Figure 7:
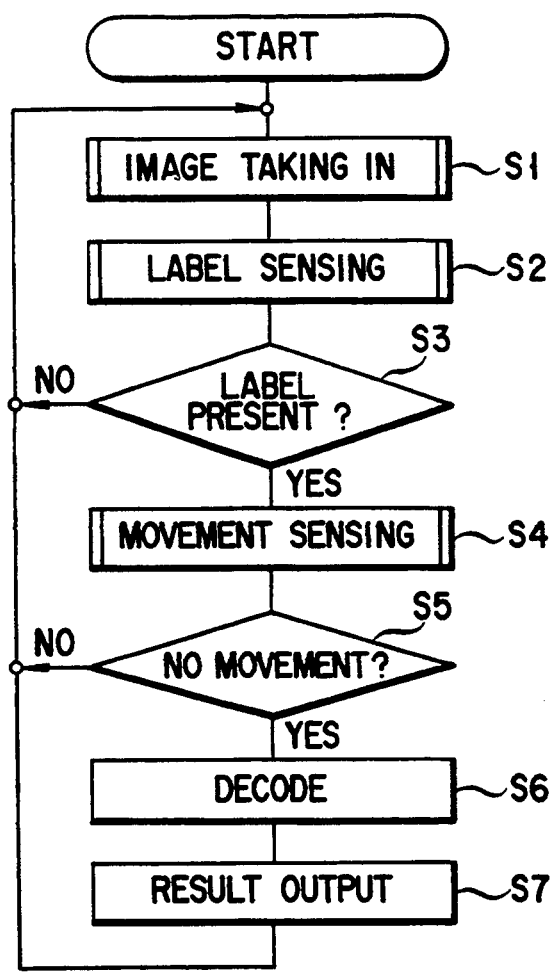
FIG. 7 is a flowchart for explaining a general operation of the third embodiment.

FIG. 7 is a flowchart showing an outline of the algorithm of reading the label information at the CPU 32. In this specification, flowcharts will be drawn according the rotational conventions of the C programming language.

First, by calling an image taking-in routine explained later (step S1), two screens of digital image information are successively taken in the frame memory 31 (Bank "0" 31A and Bank "1" 31B). Here, successively taking in means storing image information on an screen in Bank "0" 31A and image information on a subsequent image in Bank "1" 31B. In this case, since a take-in command is issued to store the image information on the latest frame in Bank "0" 31A and, after the taking-in is completed, another take-in command is issued to store the image information on the latest frame in Bank "1" 31B, there is a time lag between the image information on the two screens (the time lag is expressed by (the time required to store data in Bank "0" 31A)+(0 to 1/30 second)).

Next, a label sensing routine explained later is called (step S2), and a check is made to see if a label exists using the image information in Bank "0" 31A. If there is a label, the label information is sensed.

After the judgment of the result of the label sensing process in step S2 (step S3), if it is found that there is no label, control is returned again to step S1 to call the image taking-in routine.

On the other hand, if there is a label, a movement sensing routine explained later is called (step S4), and the effect of image movement is estimated using the image information in Bank "1" 31B stored in the step S1. Here, image movement means unintentional movements of the image that occur very frequently when printed matter on which a bar code label is printed is held to the bar-code reader apparatus.

Next, after the judgment of the result of sensing movements in step S4 (step S5), if it is fount that image movements are in progress, control is returned again to step S1 to call the image taking-in routine.

If there is no image movements, decoding is done (step S6), and the result is supplied to the host computer 50 and related circuits.

The various processing routines described above will be explained in detail.

Figure 8:
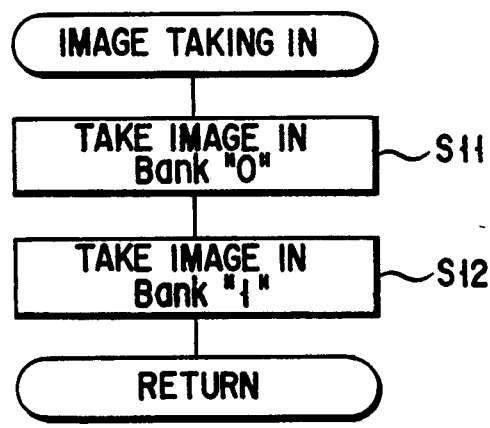
FIG. 8 is a flowchart for explaining the image taking-in routine of FIG. 7.

First, referring to the FIG. 8 flowchart, the image taking-in routine called in step S1 will be explained.

Digital image information is taken in Bank "0" 31A of the frame memory 31 from the signal processing section 20 (step S11). Then, the digital image information is taken in Bank "1" 31B of the frame memory 6 from the two-dimensional imaging apparatus 5 (step S12). This allows of image information of two screens to be taken in successively.

Figure 9:
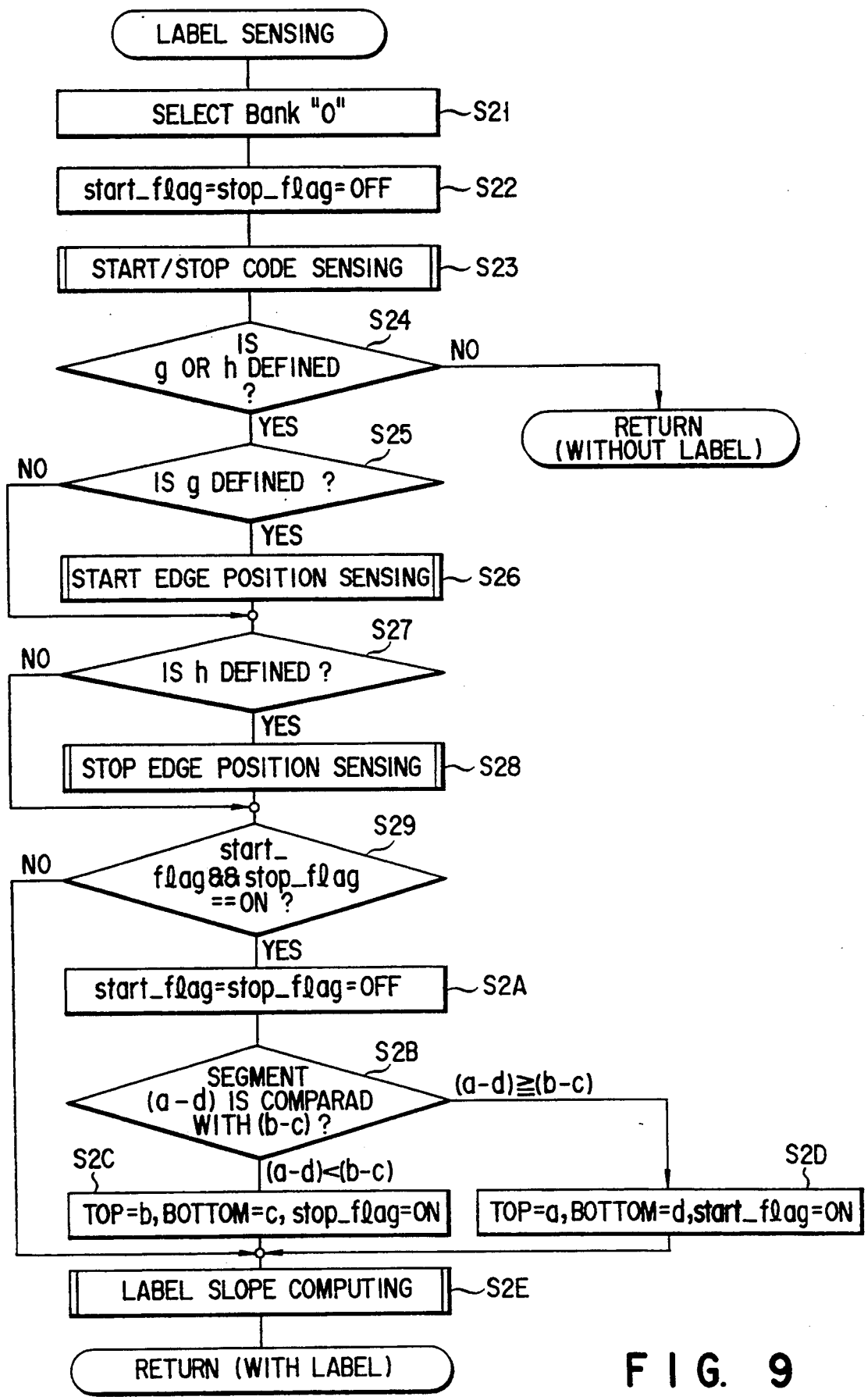
FIG. 9 is a flowchart for explaining the label sensing routine of FIG. 7.
Figure 10A:
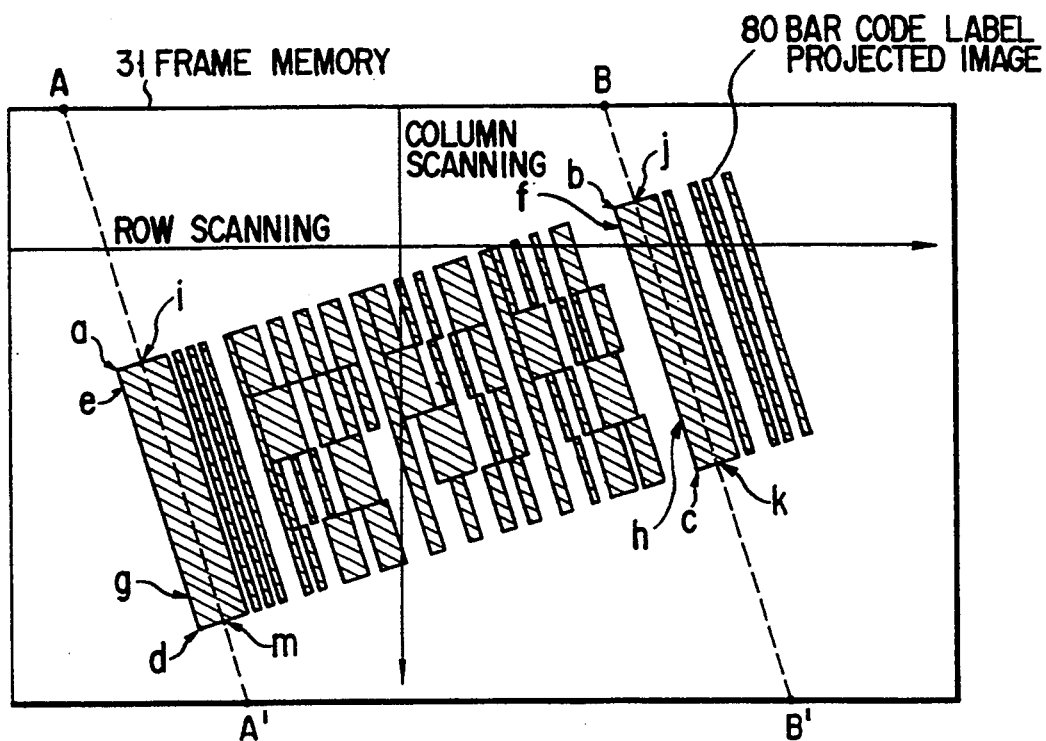
FIG. 10A is a view showing the contents of the frame memory when the image of a bar code label in the PDF-417 code system has been taken in, for the purpose of explaining how to sense the label.

Next explained will be the label sensing routine called at step S2, referring to the flowchart of FIG. 9 and the projected label image 80 of FIG. 10A. The label sensing routine includes two types of label sensing processes: the sensing of the presence and absence of a label and the sensing of label position information, that is, the determining of an extracting range (variables TOP and BOTTOM) for extracting the image information from the frame memory 31 so as to be parallel with the label as well as the slope of the label (variable SLOPE). Here, the value of variable TOP indicates the top coordinates of the label and the contents of variable BOTTOM indicate the bottom coordinates of the label. The contents of variable SLOPE represent the slope of the label.

In the label sensing routine, the image information in Bank "0" 31A of the frame memory 31 is selected as the image information to be processed (step S21). Then, the label sensing flag is initialized (step S22). The label sensing flag is composed of a start sensing flag "start__flag" and a stop sensing flag "stop__flag." These label sensing flags are used to indicate which of the start code 72 and the stop code 73 should be selected and processed in a process explained later. This is because when both of the start code 72 and the stop code 73 are sensed, the more reliable one must be selected.

Next, a start/stop code sensing routine explained later is called (step S23) to sense whether or not the image information stored in Bank "0" 31A of the frame memory 31 contains a start and/or a stop code. That is, coordinates e, f, g, and h in FIG. 10A are sensed (all the four coordinate variables are not necessarily sensed; for example, in the case of FIG. 10B, coordinate variables f and h may not be obtained). If a start and a stop code are sensed and determined by this routine, coordinate variable g on the frame memory 31 in FIG. 10A is defined for the start code 72, and coordinate variable h is defined for the stop code 73. Here, coordinate variable e indicates the coordinates at which the start code is first found, f the coordinates at which the stop code 73 is first found, g the coordinates at which the start code 72 is last found, and h the coordinates at which the stop code is last found.

Then, it is judged whether or not one of coordinates g and h is defined (step S24), and if not, it is determined that there is no label and control escapes from this processing. That is, control returns with the information containing no label. Although in this specification, the flowchart is drawn as shown in the figure because the flow is written according to the rotational conventions of the C language, the conventions of FORTRAN would produce a different flowchart in which return is made after a no-label flag is set up.

In the way described above, whether a label is present or not is sensed.

Next, performed is the sensing of label position information, that is, the computing of an extracting range (variables TOP and BOTTOM) for extracting the image data from the frame memory 31 so as to be parallel with the label as well as the slope of the label (variable SLOPE).

Specifically, at step S24, if it is judged that one of coordinates g and h is defined, and then it is judged whether or not coordinate variable g is defined (step S25). If not, control proceeds to step S27. If coordinate variable g is defined, a start edge position sensing routine explained later is called (step S26) to sense the start edge position. The start edge sensing defines coordinate variables i and m as shown in FIG. 10A on the basis of coordinate variables e and g (when coordinate variable g has been defined, then naturally coordinate variable e has also been defined), and further coordinate variables a and d. Additionally, "start_flag" is set and coordinate variables TOP and BOTTOM are defined. Here, each of coordinate variables a and d indicates one of the coordinates of the four corners of the label.

Next, it is judged whether or not coordinate variable h is defined (step S27), and if not, control goes to step S29. If coordinate variable h is defined, a stop edge position sensing routine explained later is called (step S28) to sense the stop edge position. The stop edge sensing defines coordinate variables as shown in FIG. 10A on the basis of coordinate variables f and h (when coordinate variable h has been defined, then coordinate variable f has also been defined), and further coordinate variables b and c. Additionally, stop_flag is set and coordinate variables TOP and BOTTOM are defined. Here, each of coordinate variables b and c indicates one of the coordinates of the four corners of the label.

Next, it is judged whether or not both of start_flag and stop_flag are on (step S29). If none of them are on, control proceeds to step S2E. Here, the symbol "&&" means logical product.

If both flags are on, both of start_flag and stop_flag are reset once (step S2A). Then, segment (a-d) is compared with segment (c-d) (step S2B), and either the start code 72 or the stop code 73 whose segment is longer than the other is selected as that to be processed. The longer one is selected as a reference in processing since the main reason why one code becomes shorter than the other in normal operation is that the former sometimes sticks out from the screen.

If segment (a-d) is shorter than segment (b-c), the value of coordinate variable b is substituted into coordinate variable TOP and the value of coordinate variable c is substituted into coordinate variable BOTTOM to define data to determine an extracting range of label information, and further stop_flag is selected and turned on (step S2C).

Conversely, if segment (a-d) is longer than segment (b-c), the value of coordinate variable a is substituted into coordinate variable TOP and the value of coordinate variable d is substituted into coordinate variable BOTTOM to define data to determine an extracting range of label information, and further start_flag is selected and turned on (step S2D).

Then, the label slope computing routine is called (step S2E) to obtain the label slope (variable SLOPE) from those coordinate variables TOP and BOTTOM. Control then returns together with the obtained variable and the label presence information.

Figure 11:
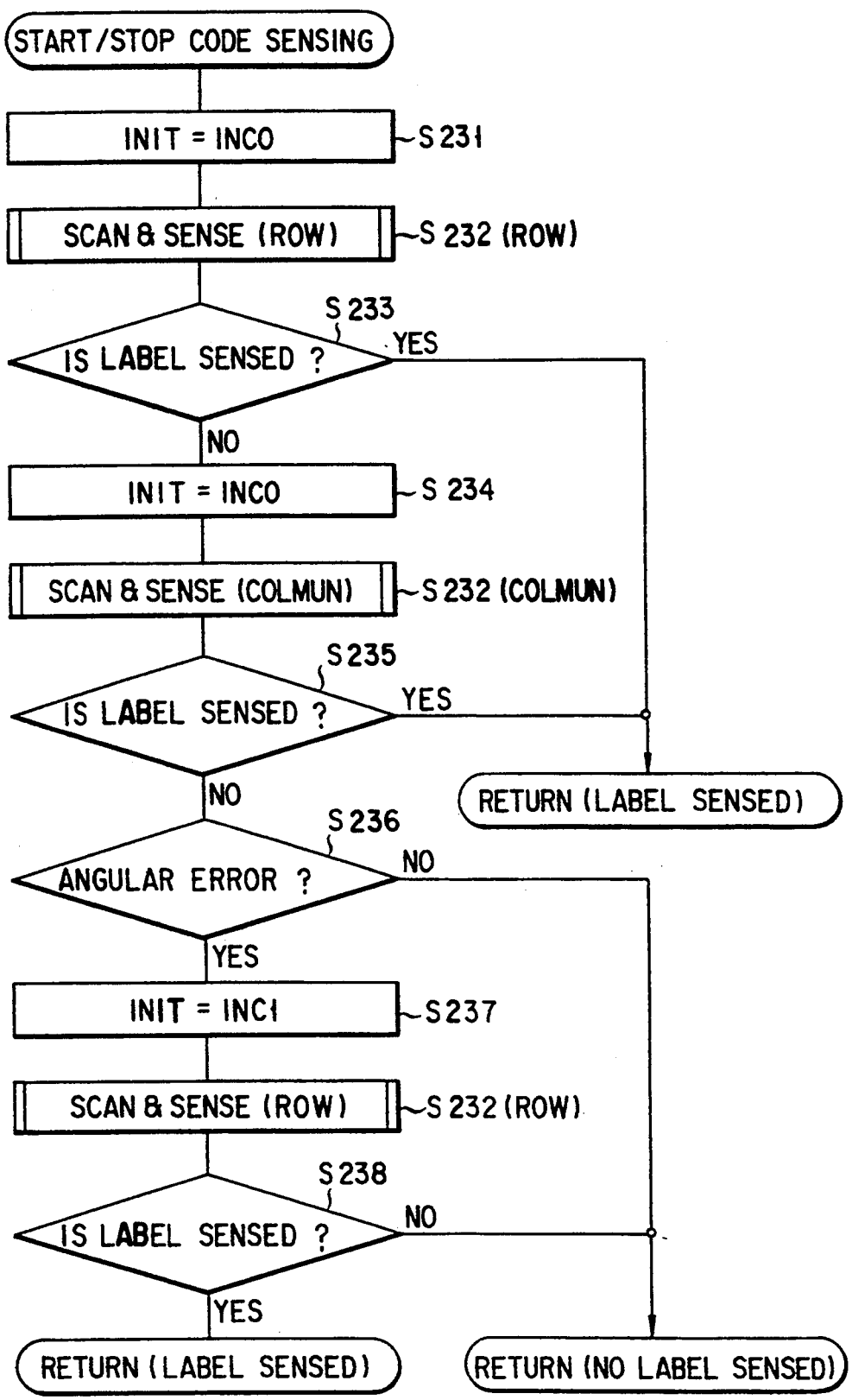
FIG. 11 is a flowchart for explaining the start/stop code sensing routine of FIG. 9.

Next explained will be the start/stop code sensing routine called at step S23 in the label sensing routine, referring to the flowchart of FIG. 11. The start/stop code sensing routine senses at least one set of coordinate variables e and g or f and h as described above.

First, the value of sensing interval variable INC0 during sensing no label is substituted into label sensing interval variable INIT (step S231). Next, a scanning & sensing (row) routine explained later is called (step S232) to scan the image information in Bank "0" 31A in the frame memory 31 in the row direction to sense start/stop codes. Here, scanning in the row direction means scanning in the longitudinal direction of the frame memory 31 as shown by row scan in FIG. 10A.

From the result of the scanning & sensing (row) routine, it is judged whether the start code 72 or the stop code 73 is sensed, or the label is sensed or not (step S233). If a label is sensed, control returns with the label presence information.

On the other hand, when no label is sensed, the value of label sensing interval variable INC0 during sensing no label is substituted into label sensing interval variable INIT (step S234). After this, the scanning & sensing (row) routine is called (step S232) to scan the image information in Bank "0" 31A in the frame memory 31 in the column direction to sense start/stop codes. Here, scanning in the column direction means scanning in the lateral direction of the frame memory 31 as shown by column scan in FIG. 10A.

From the result of the scanning & sensing (column) routine, it is judged whether the start code 72 or the stop code 73 is sensed, or the label is sensed or not (step S235). If a label is sensed, control returns with the label presence information.

When no label is sensed this time either, however, it is determined whether the cause comes from angular errors (step S236). The judgment of angular errors in the label is made by referring to the return value of the scanning & sensing routine called at step S232. Specifically, the scanning & sensing routine always checks to see if an angular error has occurred. If an error has occurred, it sets up an angular error flag and a label unsensed flag in the return value, terminates the processing there, and returns control. In the judgment of angular errors, since the subsequent processing is carried out again only in the row direction. Thus it is judged whether no-label result is obtained because of angular errors or because no label has been sensed, by judging the return value of scanning in the column direction at step S236.

When it is judged that it is not due to angular errors in step S236, control returns with information on sensing no label.

On the other hand, when it is judged that it is due to angular errors, then label sensing interval INC1 during label sensing is substituted into label sensing interval variable INIT (step S237). For the size of sensing interval variables INC0 and INC1, it is desirable that the least common multiple of both of them should basically exceed the screen range: for example, INC0=23 and INC1=17.

After that, the scanning & sensing (row) routine is called again (step S232) to scan the image information in Bank "0" 31A of the frame memory 31 in the row direction to sense the start/stop codes.

Then, it is judged whether or not the start/stop codes (or a label) are sensed (step S238). If it is found that they are sensed, control returns with information of sensing a label, and if not, control returns with information on sensing no label.

In this way, in the start/stop code sensing routine, sensing is first done in the row direction. If this scanning has failed to sense any label, then scanning is done in the column direction. If the scanning has further failed to sense any label, then it is judged whether it is due to angular errors (that is, the label is inclined too much). If it is found that it is due to an angular error, the label sensing interval is changed and scanning is done again in the row direction. Even if this fails to sense any label, it is determined that there is no label.

The reason why scanning is done only in the row direction in the case of angular errors is that the bar code label is generally placed so that row scanning may find the label, that is, the column direction may agree with the longitudinal (lateral) direction of the frame memory 31 and that by making use of this human characteristics, column scanning can be omitted. Column scanning may, of course, be done, in which case, however, the execution speed decreases.

Figure 12A:
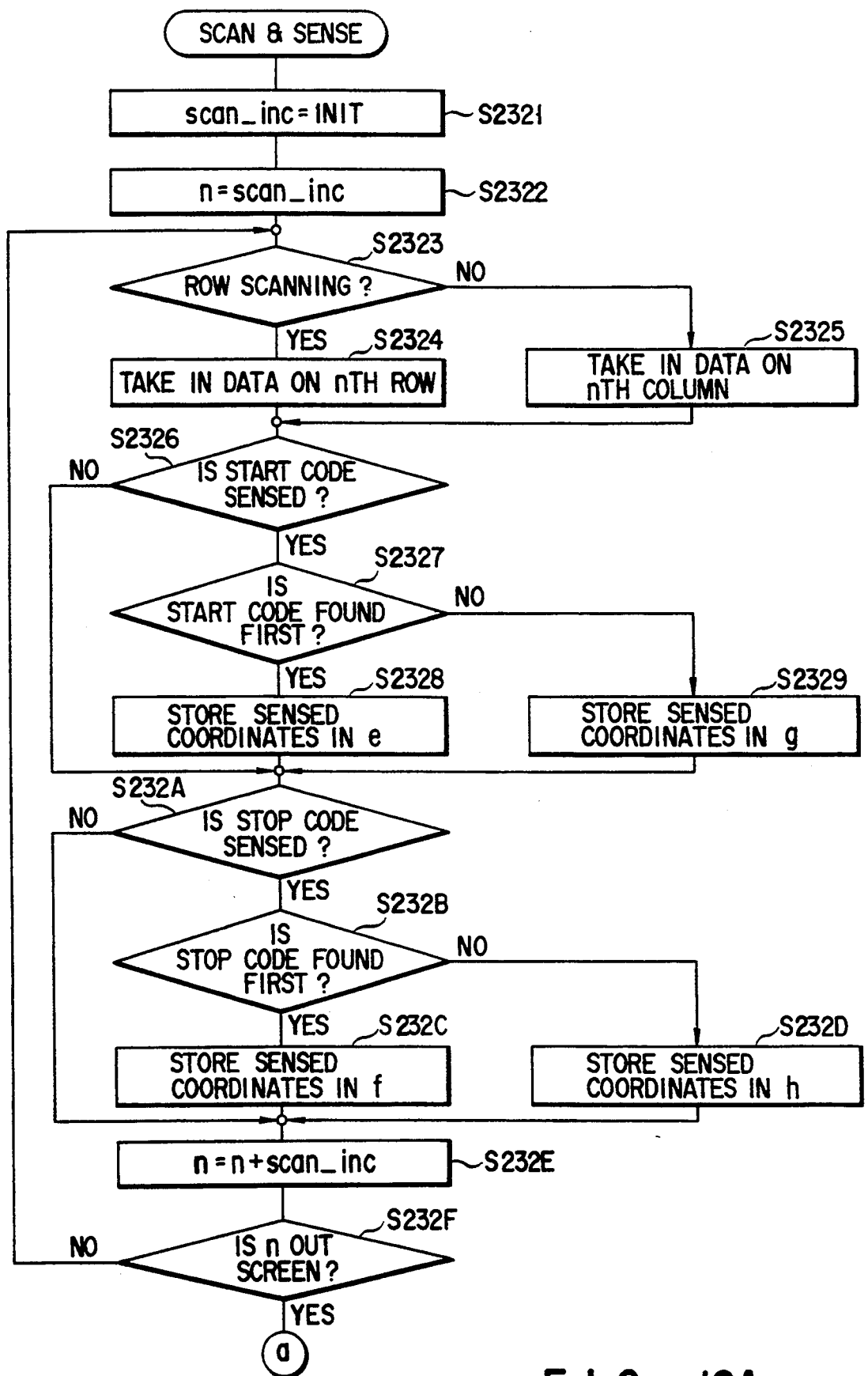
FIGS. 12A and 12B are a series of flowcharts for explaining the scanning and sensing routine of FIG. 11.
Figure 12B:
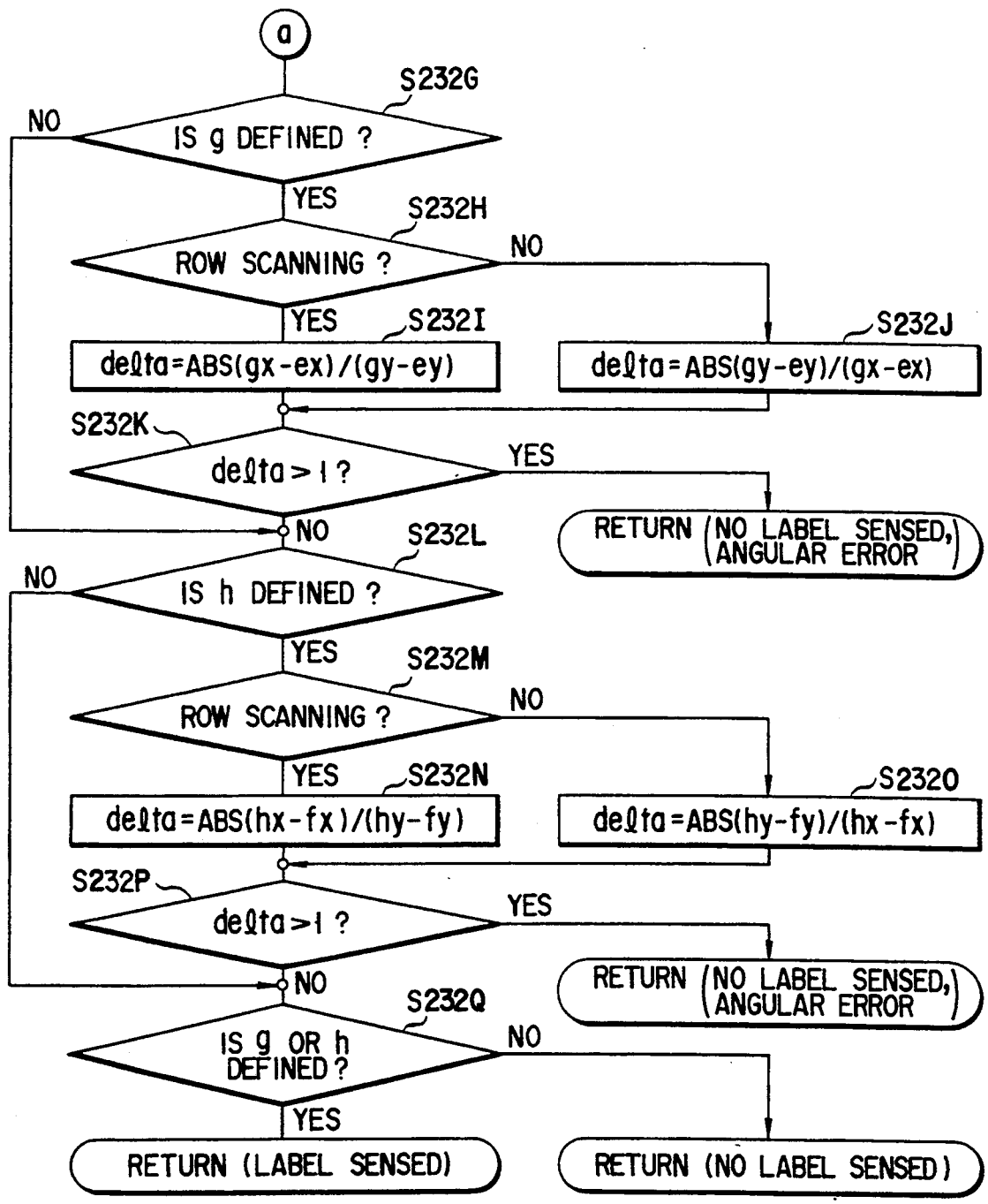

Referring to a series of flowcharts shown in FIGS. 12A and 12B, the scanning & sensing routine called in step S232 will be described. This routine scans the image information in Bank "0" 31A in the row or column direction at sensing intervals (varied under specified conditions) to determine at least one set of coordinate variables e and g and coordinate variables f and h. The direction in which scanning is done is determined when the routine is called. When at least one set of coordinate variables e and g and coordinate variables f and h has been determined and there has been no angular error at that time, it is judged that a label has been sensed and control returns to a higher-level routine. When neither one set of coordinate variables e and g more one set of coordinate variables f and h could be sensed, it is judged that there has been no label, and control returns to a higher-level routine. Even if a label has been sensed, when the label angle computed from the coordinate values shows that the label inclines more than 45° toward the scanning direction, it is judged that there has been no label and an angular error has occurred, and control returns to a higher-level routine.

Specifically, parameter scan_inc is initially set in sensing interval variable INIT (step S2321), and parameter n is initially set in the parameter scan_inc (step S2322). Here, parameter scan_inc indicates the label sensing (scanning) interval used in this routine, and parameter n shows the position of a line to be sensed (scanned).

After this initial setting, it is judged whether it is row scanning or column scanning (step S2323). If it is row scanning, the image information on the nth line is taken in (step S2324), and if it is column scanning, the image information on the nth column is taken in (step S2325).

Next, it is judged whether or not the image information taken in contains the start code 72 (step S2326). If not, control goes to step S232A. If the start code 72 exists, it is judged whether or not the start code 72 has been sensed for the first time (step S2327). If it is sensed for the first time, the sensed coordinates are stored in coordinate variable e (step S2328). If not, the sensed coordinates are stored in coordinate variable g (step S2329). The judgment of whether or not it is sensed for the first time is made based on whether a value is stored in coordinate variable e.

Similarly, it is judged whether or not the image information taken in contains the stop code 73 (step S232A). If not, control goes to step S232E. If the stop code 73 exists, it is judged whether or not the stop code 73 has been sensed for the first time (step S232B). If it is sensed for the first time, the sensed coordinates are stored in coordinate variable f (step S232C). If not, the coordinates are stored in coordinate variable h (step S232D). The judgment of whether or not it is sensed for the first time is made based on whether a value is stored in coordinate variable f.

Next, the value of parameter n is increased by the value of scan_inc to update n (step S232E) to determine the number of rows or columns to be taken in the next time. Since the length and width of the frame memory 31 are known, it is judged from these factors whether the updated n is outside the screen or not (step S232F). If it is within the screen, control is returned to step S2323.

If it is outside the screen or the scanning is completed, then it is judged whether or not coordinate variable g has been defined (step S232G). If not, control is returned to step S232L.

If the coordinate variable g has been defined, then it is judged whether row scanning or column scanning is performed (step S232H).

If row scanning is performed, the difference between the value of x-coordinate of coordinate variable g and the value of x-coordinate of coordinate variable e is divided by the difference between the value of y-coordinate of coordinate variable g and the value of y-coordinate of coordinate variable e, and the absolute value of the result is computed (represented by "ABS" in the figure). The absolute value is substituted into variable "delta" that shows the value of the slope (step S232I).

If column scanning is performed, the difference between the value of y-coordinate of coordinate variable g and the value of y-coordinate of coordinate variable e is divided by the difference between the value of x-coordinate of coordinate variable g and the value of x-coordinate of coordinate variable e, and the absolute value of the result is computed. The absolute value is substituted into variable "delta" (step S232J).

Then, by judging whether or not the absolute value "delta" of the slope obtained is larger than 1 (step S232K), it is judged whether or not an angular error has occurred. If angular error has occurred, control returns with information on sensing no label and on angular errors.

If it is not an angular error, or if it has been judged at step S232G that coordinate variable g has not been defined, then it is judged whether or not coordinate variable h has been defined (step S232L). If not, control is returned to step S232Q.

If coordinate variable h has been defined, then it is judged whether row scanning or column scanning is performed (step S232M).

If row scanning is performed, the difference between the value of x-coordinate of coordinate variable h and the value of x-coordinate of coordinate variable f is divided by the difference between the value of y-coordinate of coordinate variable h and the value of y-coordinate of coordinate variable f, and the absolute value of the result is computed. The absolute value is substituted into the absolute value of the slope "delta" (step S232N).

If column scanning is performed, the difference between the value of y-coordinate of coordinate variable h and the value of y-coordinate of coordinate variable f is divided by the difference between the value of x-coordinate of coordinate variable h and the value of x-coordinate of coordinate variable f, and the absolute value of the result is computed. The absolute value is substituted into "delta" (step S232O).

Then, by judging whether or not the absolute value "delta" of the slope obtained is larger than 1 (step S232P), it is judged whether or not an angular error has occurred. If an angular error has occurred, control returns with information on sensing no label and on angular errors.

If no angular error has occurred, or if it has been judged in step S232L that coordinate variable h has not been defined, then it is judged whether or not coordinate variable g or h has been defined (step S232Q). If it has been defined, control returns with information on sensing a label, and if not, control returns with information on sensing no label.

In this way, in steps S232G through S232J or steps S232L through S232O, the slope of the entire label is obtained by computing the slope of the start/stop codes. In step S232K or S232P, it is judged whether or not the absolute value "delta" of the slope exceeds 1. If it exceeds 1, it is judged that an angular error has occurred and no label is sensed, and control is returned. If the absolute value "delta" of the slope has not exceeded 1, it is judged at step S232Q whether or not coordinate variable g or h has been defined. If it is defined, it is judged that a label is sensed and control is returned. If not, it is judged that no label is sensed and control is returned.

The reason why the judgment of angular errors in steps S232K and S232P is made is that there is a possibility, though very low, that oversight takes place in the extracting direction in which an error should be found and the error is found in another direction. In this case, since an error will occur in a subsequent process, such sensing should be prevented. Further, the reason why a reference of angular errors is 1 is that "delta" becomes 1 at a label rotational angle of 45°.

Figure 13:
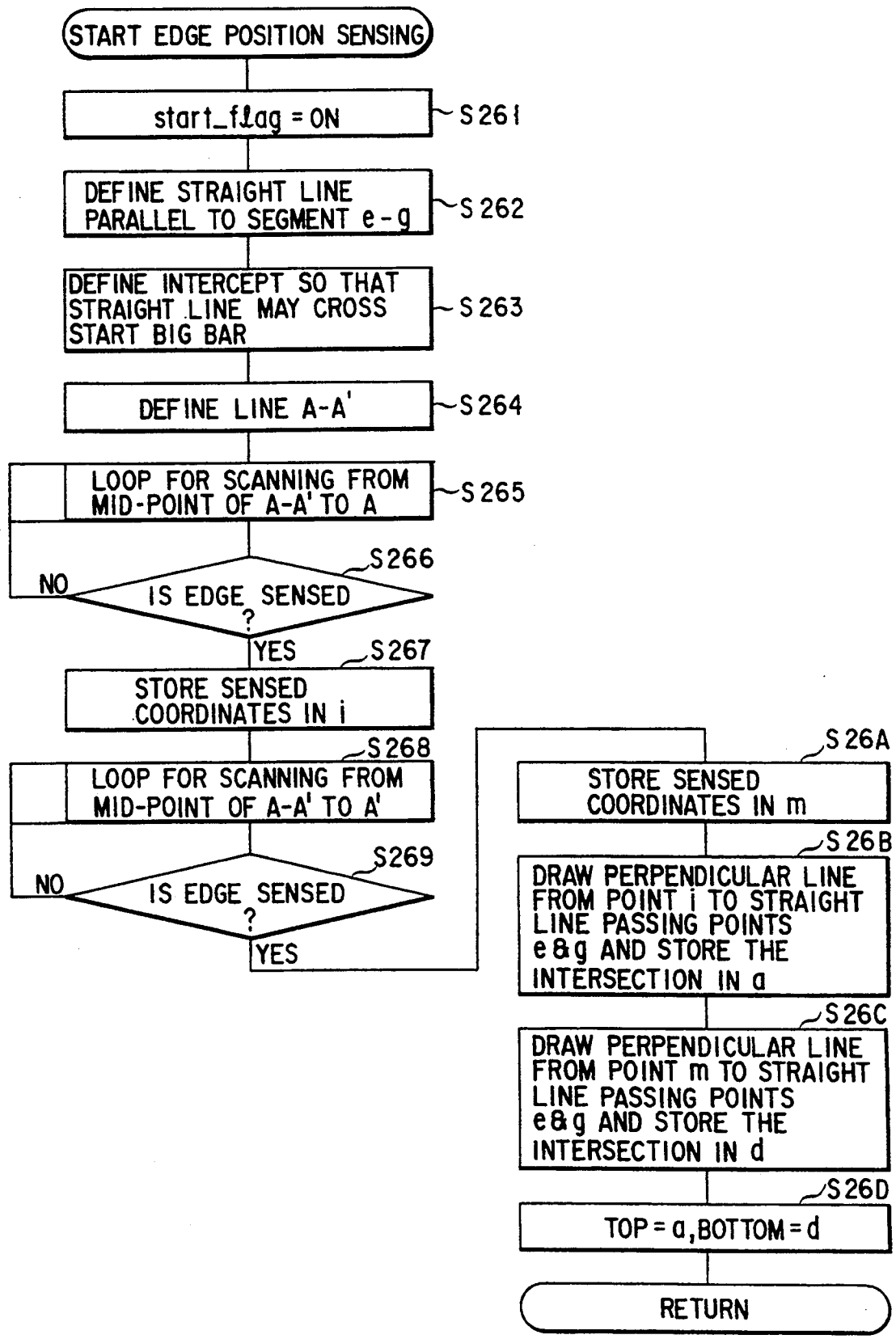
FIG. 13 is a flowchart for explaining the start edge position sensing routine of FIG. 9.

Next explained will be the start edge position sensing routine called in step S26 in the label sensing routine, referring to the flowchart of FIG. 13.

First, the start sensing flag "start_flag" is turned on (step S261) and an equation for a straight line parallel to segment e-g is defined: for example, $y = ax + b$ is defined as an equation for segment e-g (step S262). Next, an intercept b is defined so that the straight line may cross the start big bar 72A (step S263). The start code 72 is composed of, for example, the start big bar 72A consisting of eight bars, three pairs of white bars and black bars, and three white bars, that is, a total of 17 bars. The result of imaging this is assumed to be N pixels. It is known that a straight line expressed by $y = ax + b$ moves parallel as intercept b is varied. Thus, to obtain a straight line crossing the big bar 72A, intercept b must be such that the segment e-g is moved to the left as much as $\{(17 - 8/2)/17\} \times N$ pixels.

After a line crossing the start big bar 72A has been obtained, the intersections of the line and the equation defining the screen are defined as A and A' (refer to FIG. 10A) (step S264).

Then, the image information is examined sequentially, starting at the mid-point of line A-A' to point A (step S265) to check to see if there is an edge (step S266). This check can be made by, for example, comparison of intensity to examine the change of luminance, differential, or quadratic differential. When an edge is sensed this way, the sensed coordinates are stored in coordinate variable i (step S267). That is, the sensed coordinates are defined as point i.

Next, the image information is examined sequentially, starting this time at the mid-point of line A-A' to point A' (step S268) to check to see if there is an edge (step S269). When an edge is sensed this way, the sensed coordinates are stored in coordinate variable m (step S26A). That is, the sensed coordinates are defined as point m.

Then, a perpendicular line is drawn from point i indicated by coordinate variable i to the line passing points e and g indicated by coordinate variables e and g, and the coordinates of the intersection are stored in coordinate variable a (step S26B). That is, an equation for a straight line meeting at right angles with line A-A' passing point i is determined, and the intersection of this line and the line passing points e and g is obtained. The intersection is then defined as point a.

Similarly, a perpendicular line is drawn from point m indicated by coordinate variable m to the line passing points e and g indicated by coordinate variables e and g, and the coordinates of the intersection are stored in coordinate variable d (step S26C). That is, an equation for a straight line meeting at right angles with line A-A' passing point m is determined, and the intersection of this line and the line passing points e and g is obtained. The intersection is then defined as point d.

After the value of coordinate variable a thus obtained is stored in coordinate variable TOP and the value of coordinate variable d is stored in coordinate variable BOTTOM (step S26D), control is returned to a higher-level routine.

Figure 14:
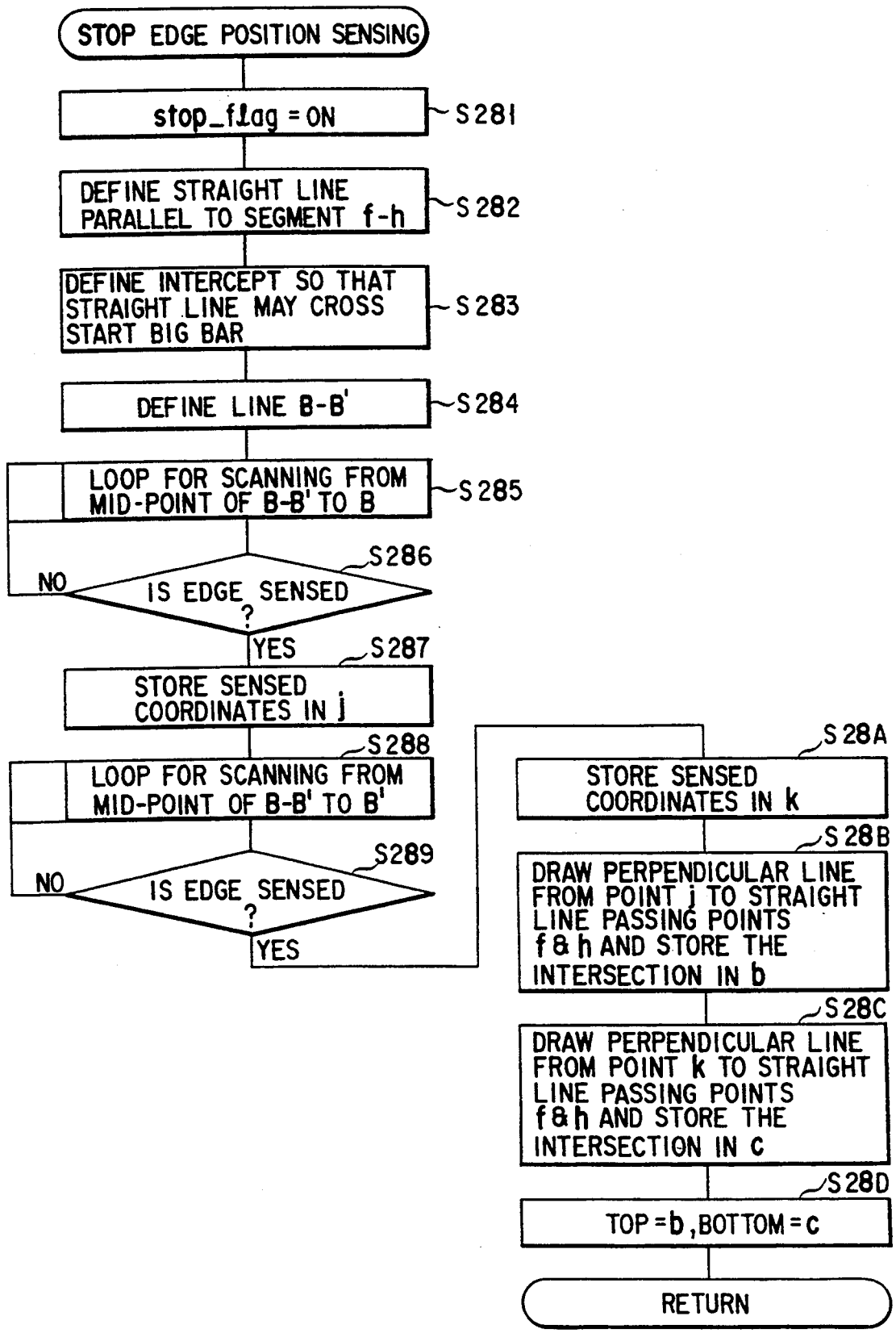
FIG. 14 is a flowchart for explaining the stop edge position sensing routine of FIG. 9.

The stop edge position sensing routine called at step S28 in the label sensing routine functions in almost the same manner as the start edge position sensing routine. FIG. 14 is a flowchart for the stop edge position sensing routine.

First, the stop sensing flag "stop_flag" is turned on (step S281) and an equation for a straight line parallel to segment f-h is defined: for example, $y = ax + b$ is defined as an equation for segment f-h (step S282). Next, an intercept b is defined so that the straight line may cross the stop big bar 73A (step S283). After a line crossing the stop big bar 73A has been obtained, the intersections of the line and the equation defining the screen are defined as B and B' (refer to FIG. 10A) (step S284).

Then, the image information is examined sequentially, starting at the mid-point of line B-B' to point B (step S285) to check to see if there is an edge (step S286). When an edge is sensed this way, the sensed coordinates are stored in coordinate variable j (step S287). That is, the sensed coordinates are defined as point j.

Next, the image information is examined sequentially, starting this time at the mid-point of line B-B' to point B' (step S288) to check to see if there is an edge (step S289). When an edge is sensed this way, the sensed coordinates are stored in coordinate variable k (step S28A). That is, the sensed coordinates are defined as point k.

Then, a perpendicular line is drawn from point j indicated by coordinate variable j to the line passing points f and h indicated by coordinate variables f and h, and the coordinates of the intersection are stored in coordinate variable b (step S28B). That is, an equation for a straight line meeting at right angles with line B-B' passing point j is determined, and the intersection of this line and the line passing points f and h is obtained. The intersection is then defined as point b.

Similarly, a perpendicular line is drawn from point k indicated by coordinate variable k to the line passing points f and h indicated by coordinate variables f and h, and the coordinates of the intersection are stored in coordinate variable c (step S28C). That is, an equation for a straight line meeting at right angles with line B-B' passing point k is determined, and the intersection of this line and the line passing points f and h. The intersection is then defined as point c.

After the value of coordinate variable b thus obtained is stored in coordinate variable TOP and the value of coordinate variable c is stored in coordinate variable BOTTOM (step S28D), control is returned to a higher-level routine.

Figure 10B:
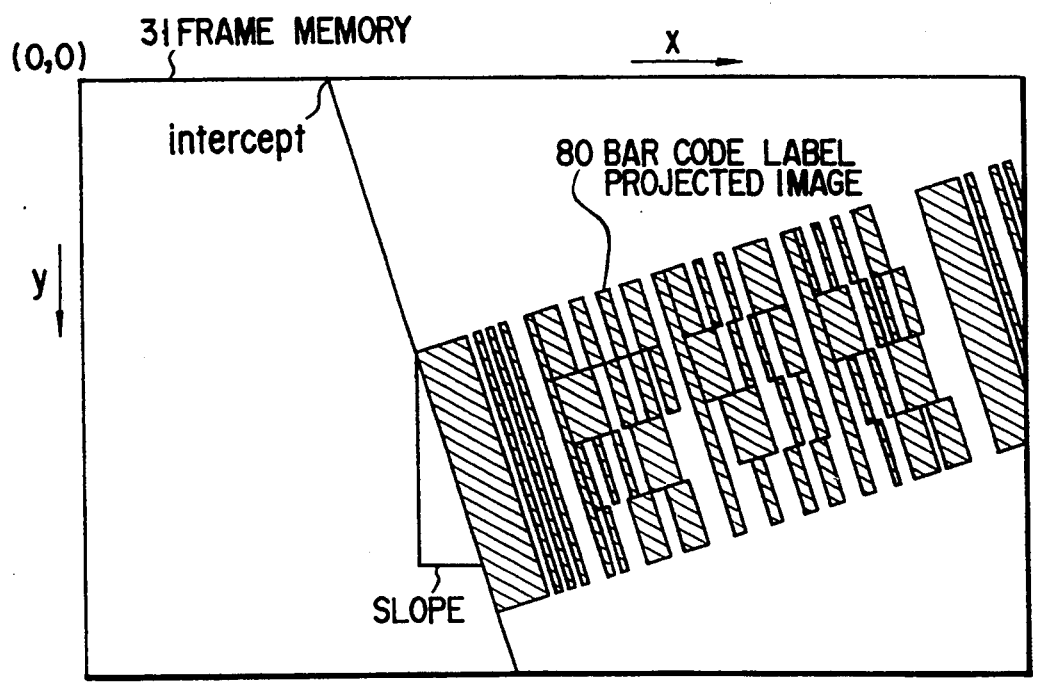
FIG. 10B is a view showing the contents of the frame memory when the image of a bar code label in the PDF-417 code system has been taken in, for the purpose of explaining how to determine the slope of the label.

Next explained will be the label slope computing routine called in step S2E in the label sensing routine, referring to the flowchart of FIG. 15 and the explanatory diagram of FIG. 10B for obtaining the slope of the label in row scanning. FIG. 10B shows a case where the start code 72 is selected as a reference in row scanning.

First, it is judged whether or not row scanning is performed (step S2E1). If true, control goes to step S2E2. If column scanning is performed, control proceeds to step S2E4.

In the case of row scanning, the value of x-coordinate of coordinate variable BOTTOM is divided by the result of subtracting the value of y-coordinate of coordinate variable TOP from the value of y-coordinate of coordinate variable BOTTOM, and the value of x-coordinate of coordinate variable TOP is divided by the result of subtracting the value of y-coordinate of coordinate variable TOP from the value of y-coordinate of coordinate variable BOTTOM, and then the difference between these two quotients is stored in slope variable SLOPE (step S2E2). Next, the result of multiplying y-coordinate of coordinate variable BOTTOM by x-coordinate of coordinate variable TOP is divided by the result of subtracting the value of y-coordinate of coordinate variable TOP from the value of y-coordinate of coordinate variable BOTTOM, and the result of multiplying x-coordinate of coordinate variable BOTTOM by y-coordinate of coordinate variable TOP is divided by the result of subtracting the value of y-coordinate of coordinate variable TOP from the value of y-coordinate of coordinate variable BOTTOM. Then the difference of these two quotients is stored in intercept variable "intercept" (step S2E3). In FIG. 15, the superscript asterisk (*) means multiplication sign x.

In the case of column scanning, the value of y-coordinate of coordinate variable BOTTOM is divided by the result of subtracting the value of x-coordinate of coordinate variable TOP from the value of x-coordinate of coordinate variable BOTTOM, and the value of y-coordinate of coordinate variable TOP is divided by the result of subtracting the value of x-coordinate of coordinate variable TOP from the value of x-coordinate of coordinate variable BOTTOM, and then the difference between these two quotients is stored in slope variable SLOPE (step S2E4). Next, the result of multiplying x-coordinate of coordinate variable BOTTOM by y-coordinate of coordinate variable TOP is divided by the result of subtracting the value of x-coordinate of coordinate variable TOP from the value of x-coordinate of coordinate variable BOTTOM, and the result of multiplying y-coordinate of coordinate variable BOTTOM by x-coordinate of coordinate variable TOP is divided by the result of subtracting the value of x-coordinate of coordinate variable TOP from the value of x-coordinate of coordinate variable BOTTOM, and then the difference of these two quotients is stored in intercept variable "intercept" (step S2E5).

Next the movement sensing routine called in step S4 will be described by referring to the flowchart of FIG. 16.

This time, Bank "1" 31B of the frame memory 31 is selected for the image information to be processed (step S41), and the image movement sensing flag "verify" is initialized to off (step S42). Then, it is judged whether the start sensing flag "start_flag" is on or not (step S43). If it is on, a start code verifying routine explained later is called (step S44) to verify the start code 72. If it is off, a stop code verifying routine explained later is called (step S45) to verify the stop code 73. Then, by judging whether the image movement sensing flag "verify" is on or not (step S46), the verify result is judged. If the image movement sensing flag "verify" is on, control returns with information on sensing movement, and if it is off, control returns with information on sensing no movement.

Figure 17A:
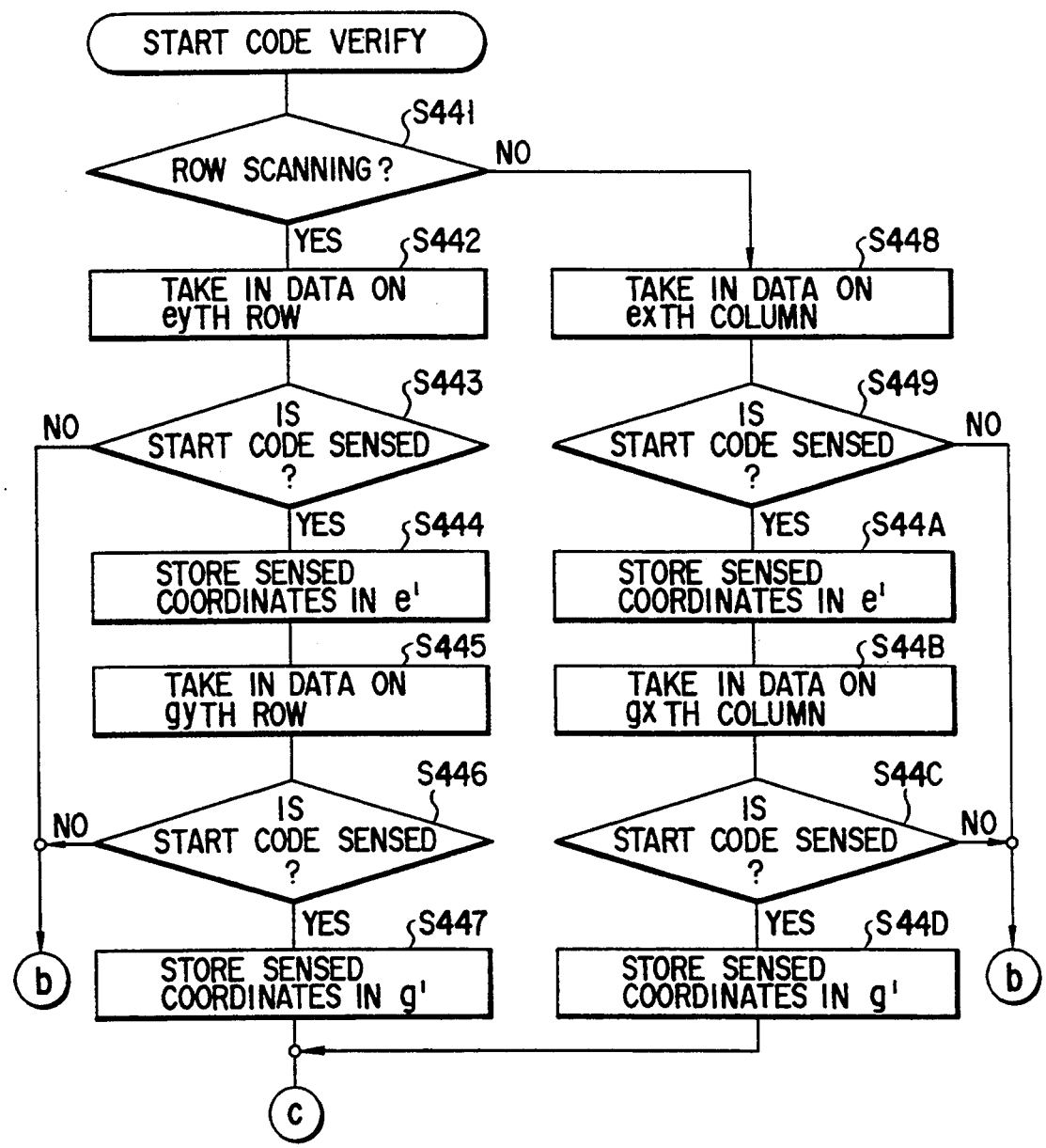
FIGS. 17A and 17B are a series of flowcharts for explaining the start code verifying routine of FIG. 16.
Figure 17B:
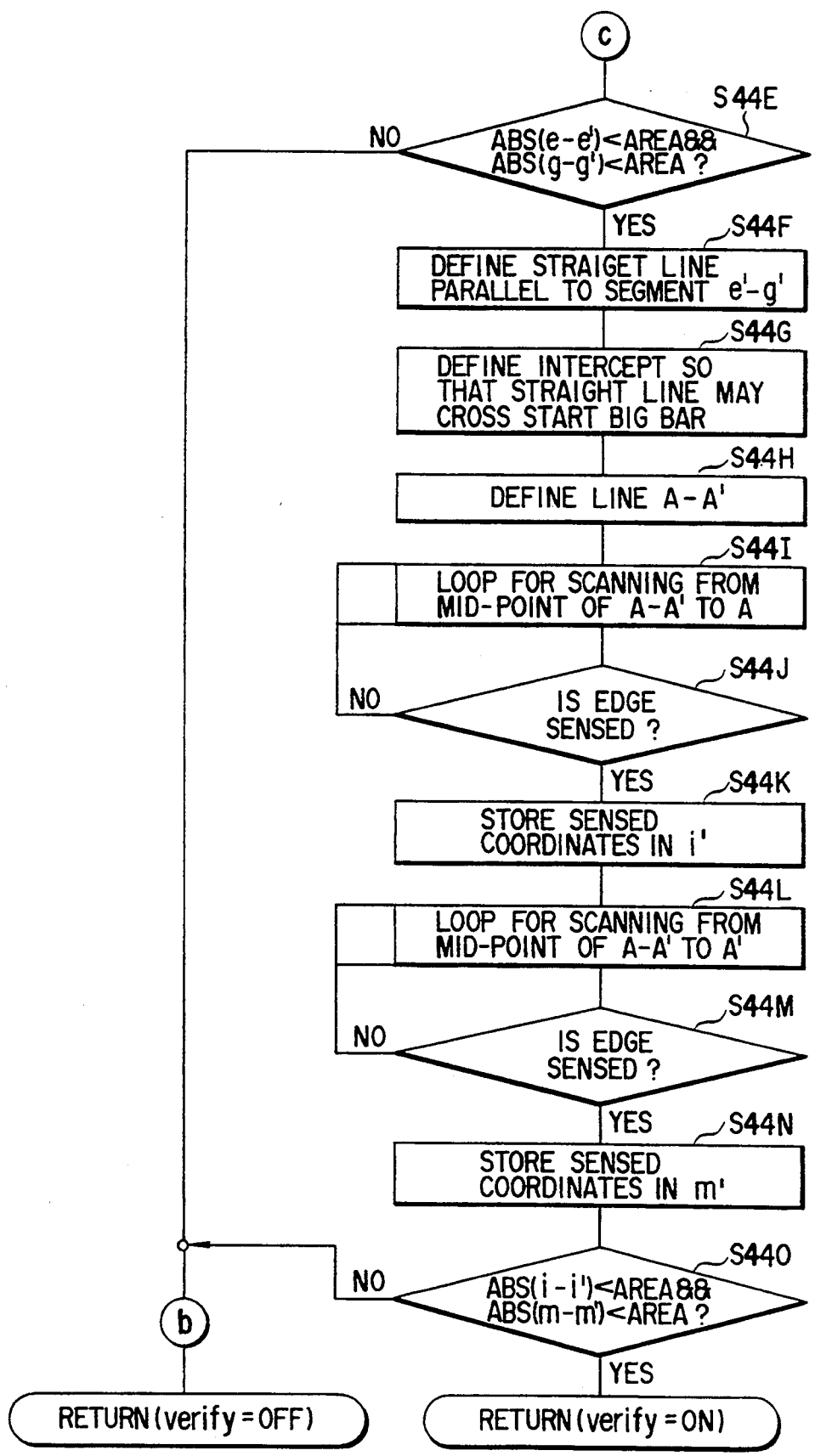

Next, the start code verifying routine called in step S44 in the movement sensing routine will be described by referring to the series of flowcharts of FIGS. 17A and 17B. In the figure, the coordinate marked with (') indicates the position sensed in image 1 (Bank "1" 31B). Specifically, coordinates e are assumed to be obtained by the label sensing routine called in step S2. They are the coordinates at which the start code 72 sensed in image 0 (Bank "0" 31A) is found for the first time. On the other hand, coordinates e' are obtained by scanning image 1 (Bank "1" 31B) under the same conditions (the scanning direction and the scanning position) as the case of finding coordinates e. Therefore, if there is no label movement between image 0 and image 1, then coordinates e and e' will be the same. If the value of image movement error range AREA is set to, for example, 2, it will be judged that the image has not moved, provided the difference in coordinates e between images is within ±1 pixel in the x- and y-directions.

It is judged whether row scanning is performed or not (step S441). If row scanning is performed, control goes to step S442, and if column scanning is performed, control proceeds to step S448.

In the case of row scanning, first, the image information on the line indicated by the value of y coordinate of coordinate variable e sensed in Bank "0" 31A is taken in from Bank "1" 31B (step S442), and it is judged whether or not the start code 72 is sensed (step S443). If not, control returns with information on image movement sensing flag "verify"=OFF to a higher-level routine. If the start code 72 is sensed, the sensed coordinates are stored in coordinate variable e' (step S444). Then, this time, the image information on the line indicated by the value of y-coordinate of coordinate variable g sensed in Bank "0" 31A is taken in from Bank "1" 31B (step S445), and it is judged whether or not the start code 72 is sensed (step S446). If not, control returns with information on image movement sensing flag "verify"=-OFF to a higher-level routine. If the start code 72 is sensed, the sensed coordinates are stored in coordinate variable g' (step S444) and then control proceeds to step S44E.

On the other hand, in the case of column scanning, first, the image information on the line indicated by the value of x coordinate of coordinate variable e sensed in Bank "0" 31A is taken in from Bank "1" 31B (step S448), and it is judged whether or not the start code 72 is sensed (step S449). If not, control returns with information on image movement sensing flag "verify"=-OFF to a higher-level routine. If the start code 72 is sensed, the sensed coordinates are stored in coordinate variable e' (step S44A). Then, this time, the image information on the line indicated by the value of x-coordinate of coordinate variable g sensed in Bank "0" 31A is taken in from Bank "1" 31B (step S44B), and it is judged whether or not the start code 72 is sensed (step S44C). If not, control returns with information on image movement sensing flag "verify"=OFF to a higher-level routine. If the start code 72 is sensed, the sensed coordinates are stored in coordinate variable g' (step S44D).

Then, the absolute value of the difference between coordinate variables e and e' and that of the difference between coordinate variables g and g' are computed. It is judged whether they are within the image movement error range AREA (step S44E). If not, then control returns with information on image movement sensing flag "verify"=OFF to a higher-level routine.

As described above, at steps S441 through S44E, it is judged whether coordinates e and g sensed in Bank "0" 31A are within the permissible error in Bank "1" 31B.

If it is judged that they are within the permissible error, an equation for a straight line parallel to segment e'-g' is defined: for example, y=ax+b is defined as an equation for segment e'-g' (step S44F). Next, an intercept b is defined so that the straight line may cross the start big bar 72A (step S44G). After a line crossing the start big bar 72A has been obtained, the intersections of the line and the equation defining the screen are determined as A and A', respectively (step S44H).

Then, the image information is examined sequentially, starting at the mid-point of line A–A' to point A (step S44I) to check to see if there is an edge (step S44J). When an edge is sensed this way, the sensed coordinates are stored in coordinate variable i' (step S44K). That is, the sensed coordinates are defined as point i'.

Next, the image information is examined sequentially, starting this time at the mid-point of line A–A' to point A' (step S44L) to check to see if there is an edge (step S44M). When an edge is sensed this way, the sensed coordinates are stored in coordinate variable m' (step S44N). That is, the sensed coordinates are defined as point m'.

Then, the absolute value of the difference between coordinate variables i and i' and that of the difference between coordinate variables m and m' are computed. It is judged whether they are within the image movement error range AREA (step S44O). If not, then control returns with information on image movement sensing flag "verify"=OFF to a higher-level routine. If true, control returns with information on image movement sensing flag "verify"=ON to a higher-level routine.

As described above, in steps S44F through S44O, it is judged whether or not coordinates i and m sensed in Bank "0" 31A are within the permissible error in Bank "1" 31B. If all are within the permissible range, the image movement flag "verify" is turned on and control is returned. If any one is outside the permissible range, the image movement sensing flag "verify" is turned off and control is returned.

Next, the stop code verifying routine called in step S45 in the movement sensing routine will now be described by referring to FIGS. 18A and 18B flowcharts. This stop code verifying routine is almost the same as the start code verifying routine.

It is judged whether row scanning is performed or not (step S451). If row scanning is performed, control goes to step S452, and if column scanning is performed, control proceeds to step S458.

In the case of row scanning, first, the image information on the line indicated by the value of y coordinate of coordinate variable f sensed in Bank "0" 31A is taken in from Bank "1" 31B (step S452), and it is judged whether or not the stop code 73 is sensed (step S453). If not, control returns with information on image movement sensing flag "verify"=OFF to a higher-level routine. If the stop code 73 is sensed, the sensed coordinates are stored in coordinate variable f' (step S454). Then, this time, the image information on the line indicated by the value of y-coordinate of coordinate variable h sensed in Bank "0" 31A is taken in from Bank "1" 31B (step S455), and it is judged whether or not the stop code 73 is sensed (step S456). If not, control returns with information on image movement sensing flag "verify"=OFF to a higher-level routine. If the stop code 73 is sensed, the sensed coordinates are stored in coordinate variable h' (step S457) and then control proceeds to step S45E.

On the other hand, in the case of row scanning, first, the image information on the line indicated by the value of x coordinate of coordinate variable f sensed in Bank "0" 31A is taken in from Bank "1" 31B (step S458), and it is judged whether or not the stop code 73 is sensed (step S459). If not, control returns with information on image movement sensing flag "verify"=OFF to a higher-level routine. If the stop code 73 is sensed, the sensed coordinates are stored in coordinate variable f' (step S45A). Then, this time, the image information on the line indicated by the value of x coordinate of coordinate variable h sensed in Bank "0" 31A is taken in from Bank "1" 31B (step S45B), and it is judged whether or not the stop code 73 is sensed (step S45C). If not, control returns with information on image movement sensing flag "verify"=OFF to a higher-level routine. If the stop code 73 is sensed, the sensed coordinates are stored in coordinate variable h' (step S45D).

Then, the absolute value of the difference between coordinate variables f and f' and that of the difference between coordinate variables h and h' are computed. It is judged whether or not they are within the image movement error range AREA (step S45E). If not, then control returns with information on image movement sensing flag "verify"=OFF to a higher-level routine.

If it is judged that they are within the permissible range, an equation for a straight line parallel to segment f'-h' is defined: for example, y=ax+b is defined as an equation for segment f'-h' (step S45F). Next, an intercept b is defined so that the straight line may cross the stop big bar 73A (step S45G). After a line crossing the stop big bar 73A has been obtained, the intersections of the line and the equation defining the screen are defined as B and B', respectively (step S45H).

Then, the image information is examined sequentially, starting at the mid-point of line B–B' to point B (step S45I) to check to see if there is an edge (step S45J). When an edge is sensed this way, the sensed coordinates are stored in coordinate variable j' (step S45K). That is, the sensed coordinates are defined as point j'.

Next, the image information is examined sequentially, starting this time at the mid-point of line B–B' to point B' (step S45L) to check to see if there is an edge (step S45M). When an edge is sensed this way, the sensed coordinates are stored in coordinate variable k' (step S45N). That is, the sensed coordinates are defined as point k'.

Then, the absolute value of the difference between coordinate variables j and j' and that of the difference between coordinate variables k and k' are computed. It is judged whether or not they are within the image movement error range AREA (step S45O). If not, then control returns with information on image movement sensing flag "verify"=OFF to a higher-level routine. If true, control returns with information on image movement sensing flag "verify"=ON to a higher-level routine.

As described above, the comparation of coordinate point i in the image in Bank "0" 31A with coordinate point i' in the image in Bank "1" 32B and m with m' is performed, or the comparison of j with j' and k with k' is performed. Only when they are within the specified image moving error range, it is determined that there is no image movement, and decoding is allowed to begin. As a result, decoding can be started when a label has stopped in the proper position without permitting a decoding operation to begin while the label is in motion.

Comparing other points, for example, points a, b, c, and d, or e, f, g, and h, can also provide a similar effect.

While detailed explanation of two-dimensional bar codes has been given, the present invention may, of course, be applied to one-dimensional bar codes in a similar manner.

As described in detail, according to this invention, it is possible to provide a bar-code reader apparatus that can start decoding when a label has stopped in the proper position without permitting a decoding operation to begin while the label is in motion.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A bar-code reader apparatus comprising:
    imaging means for imaging a bar code, the bar code comprising bars and spaces;
    sensing means for sensing a movement of an image taken by said imaging means, and for generating a sensing signal responsive to sensed movement of the image; and
    control means for controlling the start of a decoding process of a bar code image taken by said imaging means based on said sensing signal from said sensing means.

2. The apparatus according to claim 1, wherein said control means includes start specifying means for outputting a decode start signal specifying the start of a decoding process when said sensing means has sensed that there is practically no movement of the bar code image that would have no effect on the decoding process.

3. The apparatus according to claim 2, further comprising decoding means for decoding bar code information from the image taken by said imaging means in response to the decode start signal from said start specifying means.

4. The apparatus according to claim 1, wherein said sensing means includes stop sensing means for comparing two images successively taken by said imaging means, and for sensing substantially no movement of the bar codes being imaged which would have no effect on the decoding process.

5. The apparatus according to claim 4, wherein said stop sensing means includes comparing means for comparing one image of a single line in the same specified position on two images successively taken by said imaging means to sense a practical stop of movement of the bar code.

6. The apparatus according to claim 5, wherein said comparing means includes:
    position sensing means for sensing the position of a specified single line in the image taken by said imaging means;
    image storage means for, when said position sensing means has sensed the position of the specified single line, storing image of the single line taken by said imaging means; and
    line comparing means for, when said position sensing means has sensed the position of the specified single line in a subsequent image, comparing the image of the single line of said subsequent image with the image of the single line stored in said image storage means to sense the practical stop of the bar code.

7. The apparatus according to claim 6, wherein said line comparing means includes:
    difference computing means for, when said position sensing means has sensed the specified single line in a subsequent image, obtaining the difference between the image of the single line in said subsequent image and the image of the single line stored in said image storage means; and
    decode start specifying means for comparing the difference between two images in the same position of the specified line obtained by said difference computing means with a preset value corresponding to such a practical stop of movement of the bar code which would have no effect on said decoding process and, if the difference between said images is within said preset value, outputting a decode start signal specifying the start of the decoding process.

8. The apparatus according to claim 7, further comprising decoding means for decoding bar code information from the image taken by said imaging means in response to the decode start signal from said decode start specifying means.

9. The apparatus according to claim 5, wherein said stop sensing means includes a plurality of said comparing means for comparing images of a plurality of single lines in a plurality of same specified positions on two images successively taken by said imaging means and, when all the comparing means have sensed a practical stop of movement of the bar code, said stop sensing means outputting a decode start signal specifying the start of a decoding process.

10. The apparatus according to claim 9, further comprising decoding means for decoding bar code information from the image taken by said imaging means in response to the decode start signal from said stop sensing means.

11. The apparatus according to claim 9, wherein the lines in said plurality of same specified positions are parallel to each other.

12. The apparatus according to claim 9, wherein the lines in said plurality of same specified positions contain lines that cross each other at right angles.

13. The apparatus according to claim 4, wherein said stop sensing means includes:
    first and second storage means for storing two images successively taken by said imaging means;
    first coordinate sensing means for sensing the coordinates of at least two specified corners of a bar code from the image stored in said first storage means;
    second coordinate sensing means for sensing the coordinates of said at least two specified corners of the bar code from the image stored in said second storage means; and
    decode start specifying means for comparing the coordinates of said at least two specified corners sensed by said first and second coordinate sensing means and, if they are within a specified permissible range, outputting a decode start signal specifying the start of a decoding process.

14. The apparatus according to claim 13, further comprising decoding means for decoding bar code information from the image stored in one of said first and second storage means in response to the decode start signal from said decode start specifying means.

* * * * *